United States Patent
Pathre

(10) Patent No.: US 11,232,244 B2
(45) Date of Patent: Jan. 25, 2022

(54) SIMULATION OF ROBOTIC PAINTING FOR ELECTROSTATIC WRAPAROUND APPLICATIONS

(71) Applicant: Dassault Systèmes Americas Corp., Waltham, MA (US)

(72) Inventor: Uday Pathre, Troy, MI (US)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 384 days.

(21) Appl. No.: 16/235,711

(22) Filed: Dec. 28, 2018

(65) Prior Publication Data
US 2020/0210543 A1    Jul. 2, 2020

(51) Int. Cl.
| | |
|---|---|
| *G06F 30/23* | (2020.01) |
| *B05D 1/06* | (2006.01) |
| *B05D 1/04* | (2006.01) |
| *G06F 111/10* | (2020.01) |

(52) U.S. Cl.
CPC .............. *G06F 30/23* (2020.01); *B05D 1/04* (2013.01); *B05D 1/06* (2013.01); *G06F 2111/10* (2020.01)

(58) Field of Classification Search
CPC .............. G06F 30/23; B05D 1/04; B05D 1/06
USPC .................................................. 703/6
See application file for complete search history.

(56) References Cited

U.S. PATENT DOCUMENTS

| | | | | |
|---|---|---|---|---|
| 4,341,815 A | * | 7/1982 | Bagby | B05B 5/004 427/477 |
| 4,761,299 A | * | 8/1988 | Hufstetler | B05B 5/03 118/629 |
| 5,081,952 A | * | 1/1992 | Grassi | B05B 5/082 118/500 |
| 5,086,972 A | * | 2/1992 | Chang | B05B 5/0536 239/3 |
| 5,102,045 A | * | 4/1992 | Diana | B05B 12/14 118/302 |

(Continued)

OTHER PUBLICATIONS

Chen et al. ("Research on Spacial Trajectory Optimization for Spray Painting Robot Oriented to 3D Entities", IEEE, 2018, pp. 1231-1236) (Year: 2018).*

(Continued)

*Primary Examiner* — Iftekhar A Khan
(74) *Attorney, Agent, or Firm* — Hamilton, Brook, Smith & Reynolds, P.C.

(57) ABSTRACT

Embodiments simulate electrostatic painting on a real-world object. An embodiment begins by receiving an indication of paint deposition rate and an indication of maximum paint accumulation for a given real-world robotically controlled electrostatic paint gun. Next, paint deposition of the given real-world robotically controlled electrostatic paint gun in a virtual environment is represented which includes, for a subject time period, computing total paint accumulation (electrostatic and direct) on a given surface element of a model representing the real-world object. In turn, a parameter file is generated that includes parameters accounting for the determined total paint accumulation for the given surface element, where the generated parameter file enables precision operation of the given real-world robotically controlled electrostatic paint gun to paint the real-world object.

20 Claims, 17 Drawing Sheets

(56) References Cited

U.S. PATENT DOCUMENTS

| | | | | |
|---|---|---|---|---|
| 5,169,673 | A | * | 12/1992 | Demeny ................. B05B 14/42 427/477 |
| 5,397,605 | A | * | 3/1995 | Barbieri ................ B05B 5/1683 239/3 |
| 5,443,642 | A | * | 8/1995 | Bienduga .................. B05B 5/08 118/688 |
| 5,466,736 | A | * | 11/1995 | Spowage ............. C09D 167/08 106/169.35 |
| 5,831,855 | A | * | 11/1998 | Kinsman ............... B05B 12/081 700/106 |
| 5,949,235 | A | * | 9/1999 | Castleman ............. G01R 31/50 324/509 |
| 6,256,597 | B1 | * | 7/2001 | Wang .................... B25J 9/1661 700/283 |
| 6,455,110 | B1 | * | 9/2002 | Fortuyn ................. B05D 1/045 427/475 |
| 6,576,861 | B2 | * | 6/2003 | Sampath ................. C23C 24/04 219/121.48 |
| 9,878,493 | B2 | * | 1/2018 | Paschkewitz ......... B29C 64/112 |
| 10,339,233 | B2 | * | 7/2019 | Davidi ..................... B05D 1/02 |
| 10,919,215 | B2 | * | 2/2021 | Johnson ................... B05D 1/04 |
| 2007/0194157 | A1 | * | 8/2007 | Golden .................. B05B 5/025 239/698 |
| 2007/0209586 | A1 | * | 9/2007 | Ebensberger .......... G09B 19/24 118/682 |
| 2010/0072309 | A1 | * | 3/2010 | Hodge ..................... B05B 9/04 239/690 |
| 2010/0196616 | A1 | * | 8/2010 | Clifford ............. B05B 12/1409 427/459 |
| 2013/0084402 | A1 | * | 4/2013 | Yamasaki ................. B05B 5/04 427/469 |
| 2014/0099448 | A1 | * | 4/2014 | Milli ....................... B05B 5/032 427/475 |
| 2014/0103149 | A1 | * | 4/2014 | Takebe ................. B05B 5/1625 239/690 |
| 2015/0017340 | A1 | * | 1/2015 | Collmer .................... B05B 5/10 427/458 |
| 2015/0209960 | A1 | * | 7/2015 | Li .......................... B25J 9/1671 700/250 |
| 2015/0210009 | A1 | * | 7/2015 | Johnson ................ B29C 64/112 264/308 |
| 2016/0207054 | A1 | * | 7/2016 | Yamasaki ............... B05B 5/035 |
| 2017/0066009 | A1 | * | 3/2017 | Bremser .................. B05D 7/14 |
| 2019/0336990 | A1 | * | 11/2019 | Fritz ....................... B05B 1/306 |
| 2019/0337004 | A1 | * | 11/2019 | Clifford ................... B05B 5/03 |
| 2020/0078814 | A1 | * | 3/2020 | Fritz ........................ B05D 7/14 |
| 2020/0190316 | A1 | * | 6/2020 | Schellekens ............. C09D 5/24 |

OTHER PUBLICATIONS

Goodman et al. ("Method for Accurate Simulation of Robotic Spray Application Using Empirical Parameterization", IEEE, 1991, pp. 1357-1368) (Year: 1991).*

Li et al. ("Paint Deposition Simulation for Robotics Automotive Painting Line", IEEE, 2014, pp. 349-354) (Year: 2014).*

Ye et al. ("Unsteady numerical simulation of electrostatic spray-painting processes with moving atomizer", 2006, Researchgate, 1-5) (Year: 2006).*

Conner et al. ("Paint Deposition Modeling for Trajectory Planning on Automotive Surfaces", IEEE, 2005, pp. 381-392) (Year: 2005).* https://community.ifma.org/fmpedia/w/fmpedia/6613 (downloaded from Internet Feb. 23, 2021).

https://www.paint-inspector.com/wiki/wrap-around-effect-1566 (downloaded from Internet Feb. 23, 2021).

Pathre, U., Delmia Painting Simulation—White Paper, 9 pages, Rev. 06, May 9, 2018.

Pathre, U., Delmia Painting Simulation—White Paper, 6 pages, Rev. 03, Mar. 17, 2017.

Dassault Systemes, User Assistance, 7 slides, Dec. 1, 2017.

* cited by examiner

1330

| Paint profile | ✕ |
|---|---|

Name: [Paint profile]
Index: [(Optional)]
List of nozzles: [Brush.1] ▼ + ✕

| Paint | Position | Calibration |
|---|---|---|

Experiment parameters

| Gun number: | (Optional) |
|---|---|
| TCP speed: | 0.35m_s |
| Test target distance: | 300mm |
| Test fluid flow rate: | 8.333e-006m3_s |
| Test % Solid: | 50.00% |
| Spray delay ON: | 0s |
| Spray delay OFF: | 0s |
| Test disk rotation speed | 30000turn_mn |
| Test disk speed shaping factor | 1.00 |
| Test air volume regulation | 6.664e-004m3_s |
| Test air volume shaping factor | 1.00 |
| Test air pressure regulation | 40N_m2 |
| Test air pressure shaping factor | 1.00 |
| Test voltage | 60000V |
| Test voltage shaping factor | 1.00 |

▼ Film deposition

| Index | Position | Thickness |
|---|---|---|
| 1 | -150mm | 0micron |
| 2 | -75mm | 50micron |
| 3 | 75mm | 50micron |
| 4 | 150mm | 0micron |

| Add values | Delete values |
|---|---|
| Import values ||
| Export values ||

| OK | Cancel |

FIG. 13

SIMULATION OF ROBOTIC PAINTING FOR ELECTROSTATIC WRAPAROUND APPLICATIONS

FIELD OF INVENTION

Embodiments of the invention generally relate to the field of computer programs and systems, and specifically, to the fields of computer aided design (CAD); computer aided engineering (CAE); 3D computer graphic modeling and simulation; modeling, simulation, analysis, and optimization of manufacturing processes; manufacturing; and usage planning and programming of manufacturing resources, such as industrial robots.

BACKGROUND

A number of systems and programs are offered on the market for the design and simulation of parts, assemblies of parts, and systems. CAD systems allow a user to construct and manipulate complex three-dimensional models of objects, assemblies of objects, or systems. CAD systems thus provide a representation of modeled objects and systems using edges or lines, in certain cases with faces. Lines, edges, faces, or polygons may be represented in various manners, e.g., non-uniform rational basis-splines (NURBS).

CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to the designers; these tools are dedicated to the display of complex objects. For example, an assembly may contain thousands of parts. A CAD system can be used to manage models of objects, which are stored in electronic files.

The advent of CAD and CAE systems allows for a wide range of representation possibilities for objects. One such representation is a finite element model (FEM). The terms finite element analysis (FEA) model, FEM, finite element mesh, and mesh are used interchangeably herein. A FEM typically represents a CAD model, and thus, may represent one or more real-world parts or an entire assembly. A FEM is a system of points called nodes which are interconnected to make a grid, referred to as a mesh.

The FEM may be programmed in such a way that the FEM has the properties of the underlying object or objects that it represents. When a FEM, or other such CAD or CAE model is programmed in such a way, it may be used to perform simulations of the object that the model represents. For example, a FEM may be used to represent the interior cavity of a vehicle, the acoustic fluid surrounding a structure, and any number of real-world objects and systems. When a given model represents an object and is programmed accordingly, it may be used to simulate the real-world object itself and interactions between the real-world object and other objects. For example, a FEM representing a stent may be used to simulate the use of the stent in a real-life medical setting.

Likewise, CAD, CAE, and FEM models may be used to improve the design and methods for creating, i.e., manufacturing, the objects that the models represent. These improvements may be identified through use of simulation techniques, such as optimization techniques that run a series of simulations using models, e.g., FEM models, in order to identify changes to the design of the objects or changes to methods of creating the objects.

SUMMARY 3D computer graphic simulation methods and techniques can be applied to manufacturing workcells and processes to simulate manufacturing processes. Results from the simulations can be downloaded on the factory floor to drive the manufacturing resources, e.g., industrial robots. In the case of industrial painting applications, industrials robots and machines are used to apply sprayed-on materials, e.g., paint, during industrial manufacture. It is noted that while embodiments are described herein as being used for paint, embodiments are not so limited and may be used in relation to any spray-on material, layer, coating, and the like.

To plan for the manufacturing painting process, it is possible with current simulation software applications to model and simulate graphically the manufacturing process using the industrial robots and the resulting paint deposition that may be expected. Simulation and planning of painting processes is based on the properties of the paint and the paint gun, the settings of the painting process, the 3D geometric models of the industrial products and parts that are being painted, and the motion instruction programs of the industrial robots being used to apply the paint. The results of the simulation can be used to finalize and optimize the paint process settings and the robot motion programs to achieve a desired uniformity and deposition thickness for the paint as it is being applied to complex geometrical object(s). The finalized robot motion programs can be downloaded as offline programs to the robots on the factory floor, thus saving time and trials required to set up the actual manufacturing process.

While methods exist for simulating painting processes, existing methods are limited to simulating and modeling painting that results from the direct flow of paint and existing methods do not simulate, model, plan, and execute paint deposition that results from wrap-around effects. Embodiments of the present invention solve this problem and provide improved methods for modeling and simulating paint deposition and for controlling robots and painting machines to paint real-world objects in manufacturing settings.

One such example embodiment provides a computer-implemented method for simulating electrostatic painting on a real-world object that begins by receiving an indication of paint deposition rate and an indication of maximum paint accumulation for a given real-world robotically controlled electrostatic paint gun. In embodiments, these "indications" are thresholds setting values and/or ranges for paint deposition rate and maximum paint accumulation. The method continues by representing paint deposition of the given real-world robotically controlled electrostatic paint gun in a virtual environment. In such an embodiment, representing paint deposition in the virtual environment includes, for a subject time period, computing total paint accumulation on a given surface element of a model representing the real-world object. Computing total paint accumulation for the surface element comprises: (1) if there is a wrap-around path within a spray zone of the paint gun for paint particles to reach the given surface element, determining wrap-around paint accumulation on the given surface element during the subject time period using the indication of paint deposition rate, where wrap-around paint accumulation stops if the maximum paint accumulation is reached, (2) determining direct paint accumulation on the given surface element for the subject time period, and (3) determining total paint accumulation for the given surface element for the subject time period by summing the determined wrap-around paint accumulation and the determined direct paint accumulation. In turn, the method continues by generating a parameter file that includes parameters accounting for the determined total paint accumulation for the given surface element where the generated parameter file enables precision operation of the given real-world robotically controlled electrostatic paint gun to paint the real-world object.

An embodiment further comprises receiving an indication of desired paint accumulation for the given surface element and, in such an embodiment, generating the parameter file further includes determining paint process settings to control the given real-world electrostatic paint gun to attain the desired paint accumulation for the given surface element and including the determined paint process settings in the parameter file. Such an example embodiment may further include transmitting the generated parameter file including the determined paint process settings to the given real-world robotically controlled electrostatic paint gun, where the transmitting causes the given real-world robotically controlled electrostatic paint gun to paint the real-world object in accordance with the determined paint process settings. According to an example embodiment, the paint process settings include at least one of: speed of the given real-world robotically controlled electrostatic paint gun, path of the given real-world robotically controlled electrostatic paint gun, and distance between the real-world object and the given real-world robotically controlled electrostatic paint gun.

An alternative embodiment includes receiving paint process parameters. In such an embodiment, the paint process parameters include at least one of: paint parameters, position parameters, and calibration parameters. Further, in yet another embodiment, the received paint process parameters are used in simulation models for determining the wrap-around paint accumulation and the direct paint accumulation.

Another embodiment computes total paint accumulation for the given surface element for a plurality of time periods which compose the total time for a painting process. In such an embodiment, computing total paint accumulation for the plurality of time periods determines total paint accumulation for the given surface element for the painting process. Yet another embodiment computes total paint accumulation on a plurality of surface elements of the model representing the real-world object for a plurality of time periods which compose the total time for a painting process. In this embodiment, computing total paint accumulation on the plurality of surface elements for the plurality of time periods determines total paint accumulation for each of the plurality of surface elements for the painting process. Such an embodiment may further include receiving an indication of desired paint accumulation for each of the plurality of surface elements and, in generating the parameter file, the method further includes determining paint process settings to control the given real-world electrostatic paint gun to attain the desired paint accumulation for each of the plurality of surface elements during the painting process and including the determined paint process settings in the parameter file. Yet another embodiment further comprises iterating determining the paint process settings to determine optimized paint process settings that attain the desired paint accumulation for each of the plurality of surface elements during the painting process.

An embodiment of the method further includes displaying, based on the generated parameter file, an indication of the determined total paint accumulation. According to yet another embodiment, the model is a finite element model and the given surface element is a given tessellated element of the finite element model.

Yet another embodiment is directed to a system to simulate electrostatic painting on a real-world object. An example system embodiment includes a processor and a memory with computer code instructions stored thereon. The processor and the memory, with the computer code instructions, are configured to cause the system to receive an indication of paint deposition rate and an indication of maximum paint accumulation for a given real-world robotically controlled electrostatic paint gun. The system is also configured to represent paint deposition of the given real-world robotically controlled electrostatic paint gun in a virtual environment where said representing, for a subject time period, includes computing total paint accumulation on a given surface element of a model representing the real-world object. In such an embodiment, computing total paint accumulation includes: (1) if there is a wrap-around path within a spray zone of the paint gun for paint particles to reach the given surface element, determining wrap-around paint accumulation on the given surface element during the subject time period using the indication of paint deposition rate, where wrap-around paint accumulation stops if the maximum paint accumulation is reached, (2) determining direct paint accumulation on the given surface element for the subject time period, and (3) determining total paint accumulation for the given surface element for the subject time period by summing the determined wrap-around paint accumulation and the determined direct paint accumulation. Moreover, to continue, the system is configured to generate a parameter file that includes parameters accounting for the determined total paint accumulation for the given surface element. In such an embodiment, the generated parameter file enables precision operation of the given real-world robotically controlled electrostatic paint gun to paint the real-world object.

In another embodiment of the system, the processor and the memory, with the computer code instructions, are further configured to cause the system to receive an indication of desired paint accumulation for the given surface element and, in generating the parameter file, the system is configured to: (i) determine paint process settings to control the given real-world electrostatic paint gun to attain the desired paint accumulation for the given surface element and (ii) include the determined paint process settings in the parameter file. According an embodiment, the system is further configured to transmit the generated parameter file, including the determined paint process settings, to the given real-world robotically controlled electrostatic paint gun where, transmitting the parameter file causes the given real-world robotically controlled electrostatic paint gun to paint the real-world object in accordance with the determined paint process settings.

Another embodiment of the system computes total paint accumulation for the given surface element for a plurality of time periods that comprise total time for a painting process, wherein computing total paint accumulation for the plurality of time periods determines total paint accumulation for the given surface element for the painting process. Yet another embodiment of the system computes total paint accumulation on a plurality of surface elements of the model representing the real-world object for a plurality of time periods composing total time for a painting process. In such an embodiment, computing total paint accumulation on the plurality of surface elements for the plurality of time periods determines total paint accumulation for each of the plurality of surface elements for the painting process. Another embodiment that computes total paint accumulation for a plurality of surface elements further includes receiving an indication of desired paint accumulation for each of the plurality of surface elements and, in generating the parameter file: (1) determining paint process settings to control the given real-world electrostatic paint gun to attain the desired paint accumulation for each of the plurality of surface elements during the painting process and (2) include in the parameter file the determined paint process settings. Such an embodiment of the system may be further configured to iterate determining the paint process settings to determine optimized paint process settings that attain the desired paint accumulation for each of the plurality of surface elements during the painting process.

In another embodiment of the system, the processor and the memory, with the computer code instructions, are further configured to cause the system to, based on the generated parameter file, display an indication of the determined total paint accumulation.

Yet another embodiment of the present invention is directed to a cloud computing implementation to simulate electrostatic painting on a real-world object. Such an embodiment is directed to a computer program product executed by a server in communication across a network with one or more clients. In such an embodiment, the computer program product comprises a computer readable medium that embodies or otherwise comprises program instructions, which, when executed by a processor, causes the processor to receive an indication of paint deposition rate and an indication of maximum paint accumulation for a given real-world robotically controlled electrostatic paint gun. Further, in such a cloud computing environment, the program instructions, when executed, further cause the processor to represent paint deposition of the given real-world robotically controlled electrostatic paint gun in a virtual environment, where, said representing includes, for a subject time period, computing total paint accumulation on a given surface element of a model representing the real-world object. In such an embodiment, computing total paint accumulation includes: (1) if there is a wrap-around path within a spray zone of the paint gun for paint particles to reach the given surface element, determining wrap-around paint accumulation on the given surface element during the subject time period using the indication of paint deposition rate, where wrap-around paint accumulation stops if the maximum paint accumulation is reached, (2) determining direct paint accumulation on the given surface element for the subject time period, and (3) determining total paint accumulation for the given surface element for the subject time period by summing the determined wrap-around paint accumulation and the determined direct paint accumulation. Further still, in the cloud computing environment, the processor is configured to generate a parameter file that includes parameters that account for the determined total paint accumulation for the given surface element where, the generated parameter file enables precision operation of the given real-world robotically controlled electrostatic paint gun to paint the real-world object.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 13 depicts a graphical user interface in which paint gun calibration parameters used in embodiments are entered.

DETAILED DESCRIPTION

Figure 1:
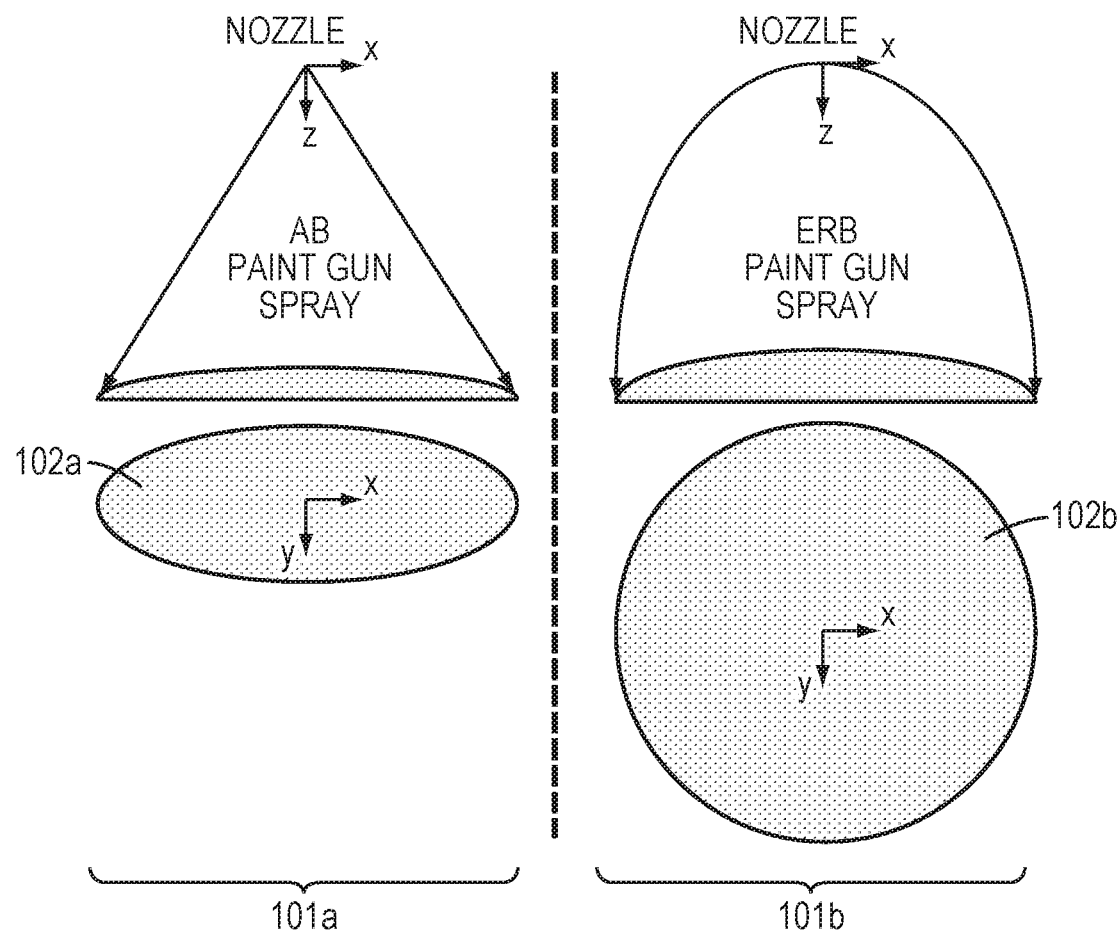
FIG. 1 illustrates spray paint shapes for paint guns that may be simulated using embodiments.

A description of example embodiments follows.

The teachings of all patents, published applications, and references cited herein are incorporated by reference in their entirety.

Generally, embodiments provide functionality for simulating electrostatic painting on real world objects. Existing modeling and simulation approaches are limited to air brush painting and electrostatic rotating brush painting type applications where the products and parts being painted are impacted by the direct flow of paint streams coming out of the paint gun as the paint gun is moved and manipulated by the painting robot. The current approaches are based on measurements of the paint properties and calibration of the paint gun parameters followed by simulation using a mathematical model that extrapolates the paint gun calibration experimental parameters for the simulated paint flow impact based on flow geometry, conservation of flow, and volume of solids. However, in the case of certain electrostatic painting applications, the paint being sprayed is capable of, and expected to, flow around to the back of the part being painted due to the effects of electrostatic attraction between the electrically charged paint spray particles and the electrically grounded part that is being painted. Embodiments provide innovative approaches for predicting the paint deposition on multiple sides of the part in such "wraparound" painting applications. Existing 3D software modeling and simulation approaches do not provide such functionality.

Embodiments solve the technical problem of simulating electrostatic painting for wraparound applications by employing an innovative calibration test for the robotic setup that includes the electrostatic paint gun and a matching enhancement in the painting simulation model as well as the deposition computation. Embodiments are based on factoring the simulation of painting during electrostatic applications into two superposed mechanisms for the paint deposition. The first deposition mechanism is the traditional approach based on conservation of paint volume and percentage solids along with geometric projection of the paint flow lines where the paint flow lines intersect with the painted surface which has been discretized into numerically manageable tessellated areas with known surface normals. The second deposition mechanism is the electrostatic settling of charged paint which happens on all areas (sides, etc.) of the painted part even if they are not directly impacted by paint spray lines of flow. The innovative new calibration experiment for the paint gun makes it possible to quantify this second deposition mechanism such that the painting model and deposition simulation can combine the above two contributors (direct and electrostatic) and provide a computational solution for the simulation of electrostatic painting during wraparound applications.

In this way, embodiments allow for simulation and analysis of the paint deposition for electrostatic painting applications where the paint being sprayed is capable of and expected to flow around to the back of the part being painted due to the effects of electrostatic attraction between the electrically charged paint spray particles and the electrically grounded part that is being painted. This type of functionality is at present not being modeled and simulated in existing robotic painting applications.

Conventional painting simulation of a spray paint gun is based on an approach that utilizes conservation of flow and conservation of volume of solids within the paint fluid. The paint deposition calculations are based on experimentally determined properties of the spray cone and the geometric projection of the spray on to the surface being painted.

FIG. 1 depicts spray cones 101a and 101b for paint guns that may be simulated using methods described herein. The spray cone 101a is for an air brush paint gun and the spray cone 101b is for an electrostatic rotating bell paint gun. The spray cone 101a has an elliptical base 102a and the spray cone 101b has a circular base 102b. Spray cones may also be configured to have a maximum height, i.e., the spray cone may be configured so as to only reach objects at a certain distance. In an embodiment, the height of the spray cone is user defined so as to limit the effect of the spray to a certain maximum truncation range. In embodiments, the properties of the base are typically determined based on calibration experiments with the actual real-world paint gun that is being simulated.

As will be described hereinbelow, a typical calibration experiment for direct paint flow accumulation involves painting stripes at a fixed height using the paint gun. The calibration test is run two times at orthogonal directions and hence the width of the two stripes define the major and minor diameters of the spray cone elliptical base. The distribution of paint thickness inside the spray cone is inferred by convolution of two orthonormal spray deposition probability distributions measured after running the paint gun calibration experiment. Further details on the direct paint accumulation calibration experiments implemented in embodiments is described hereinbelow in relation to FIGS. 2-4. Embodiments may also employ calibration methods for electrostatic paint accumulation. Further details on the electrostatic paint accumulation calibration experiments are described hereinbelow in relation to FIGS. 10-12.

When determining/simulating direct paint accumulation, it is first determined if a particular surface triangle (of a model representing an object) being processed would be inside the spray cone dimensions at a time step being simulated. After determining that a particular surface triangle is inside the spray cone during the time step being simulated, the thickness of the paint film that is deposited on the triangle for the time step is calculated. The paint thickness computation is based on a concept of geometric spray projection combined with mathematical extrapolation of the experimentally measured properties of the paint gun. These computations include simulation parameters such as the paint gun calibration properties, paint gun flow rate, the percentage solids in the paint, the user defined paint gun efficiency, the distance and the location of the paint nozzle relative to the surface triangle being painted, and the position and normal direction of the surface triangle relative to the direction of the spray. The computed deposition thickness for the time step for the triangle is then added to the running total of the ongoing simulation film build for this triangle of the surface being painted.

Figure 2:
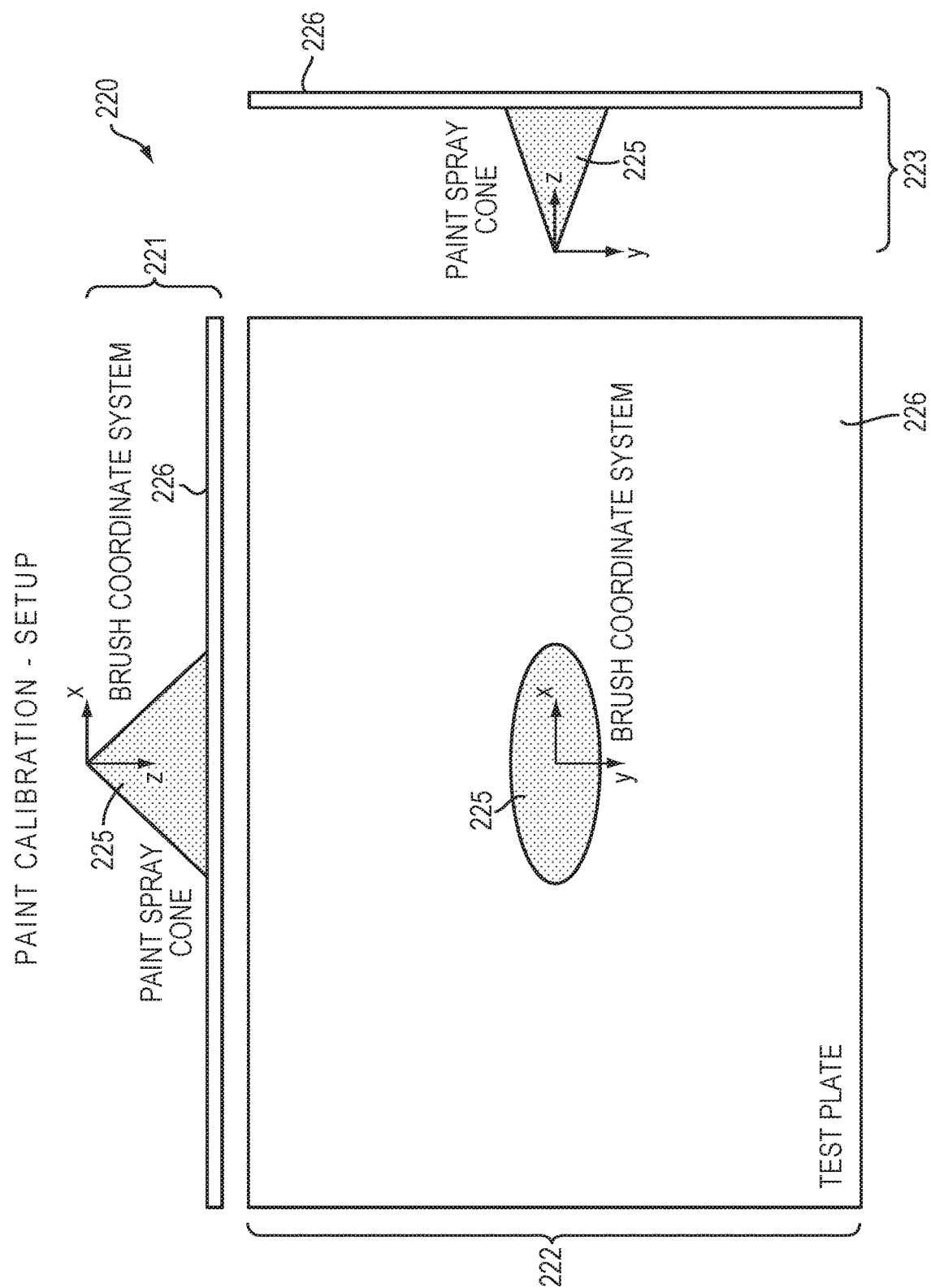
FIG. 2 depicts a paint gun calibration setup that may be employed in an embodiment.

The paint gun calibration experiment for a typical air gun type simulation, i.e., the calibration experiment used to determine properties for simulating direct paint accumulation, is based on measuring the cross section of a test paint stripe on a flat surface that has been painted using the air gun to be simulated. FIG. 2 has three views 221, 222, and 223 of a typical calibration set-up 220 where a paint gun with the paint spray cone 225 is directed at the test plate 226.

During the paint gun calibration experiment depicted in FIG. 2, the paint gun is moved by a test robot at a constant speed at a fixed height over the large flat test surface 226 which ends up being painted with a strip in the direction of motion. The test is run at a known paint flow rate and the dried paint stripe is measured at multiple points perpendicular to the stripe to tabulate the set of deposition thicknesses that identify the deposition profile which characterizes the particular paint gun. The test is run two times at orthogonal directions so that taken together, the two painted stripes define the effective overall deposition properties of that particular air gun. This type of two-dimensional distribution of paint thickness is inferred by convolution of the two orthonormal spray deposition probability distributions that result from measuring the paint deposition that results from the test painting in the two orthogonal directions.

The spray from an air brush paint gun can be non-symmetrical and thus, the calibration experiment for direct paint accumulation simulation consists of painting two stripes, one in the X direction and one in the Y direction. The paint sprayed by an electrostatic rotating bell paint gun is symmetrical and hence, only one testing pass in the X direction is required. In the case of the air brush paint gun, based on the two measured test profiles in the X and Y directions, the paint spray is visualized as an elliptical cone. The paint spray for an electrostatic paint gun is visualized to be parabolic in the side view and circular in the top view. In an embodiment, the direct paint deposition during simulation is computed by extrapolating these paint and brush properties as modified by settings in a paint profile for the simulation and all other effects of robot motion, brush alignment and distance, painted part shape and surface curvature etc. The selection and consequence of the simulation paint profile settings are described further below.

The direct paint accumulation calibration test is conducted with this type of a pair of X and Y passes so that the paint brush deposition behavior can be represented in the form of two orthonormal probability distributions that are then convoluted and extrapolated mathematically during simulation. Since one cannot do an actual paint deposition measurement experiment with a stationary paint gun, during the test the robot is moved at a constant speed which allows the paint volume flow rate to be related to the cross-sectional area of the measured paint thickness. Due to conservation of paint volume, since the X and Y tests are conducted at the same speed, then the areas under the X and Y profiles should be identical. However, due to experimental error, the measured X and Y profile areas are likely to be slightly different and hence, in an embodiment, the X and Y profiles are normalized. Once the calibration information is determined, an embodiment may also calculate and display the resulting effective computed gun transfer efficiency of the painting test. This efficiency represents the fraction of the sprayed paint (in terms of the paint solids) that is measured to have ended up being applied on the painted test surface after the experiment. The fraction of paint solids not applied to the surface is expected to have been lost to diffusion and overspray.

Figure 3:
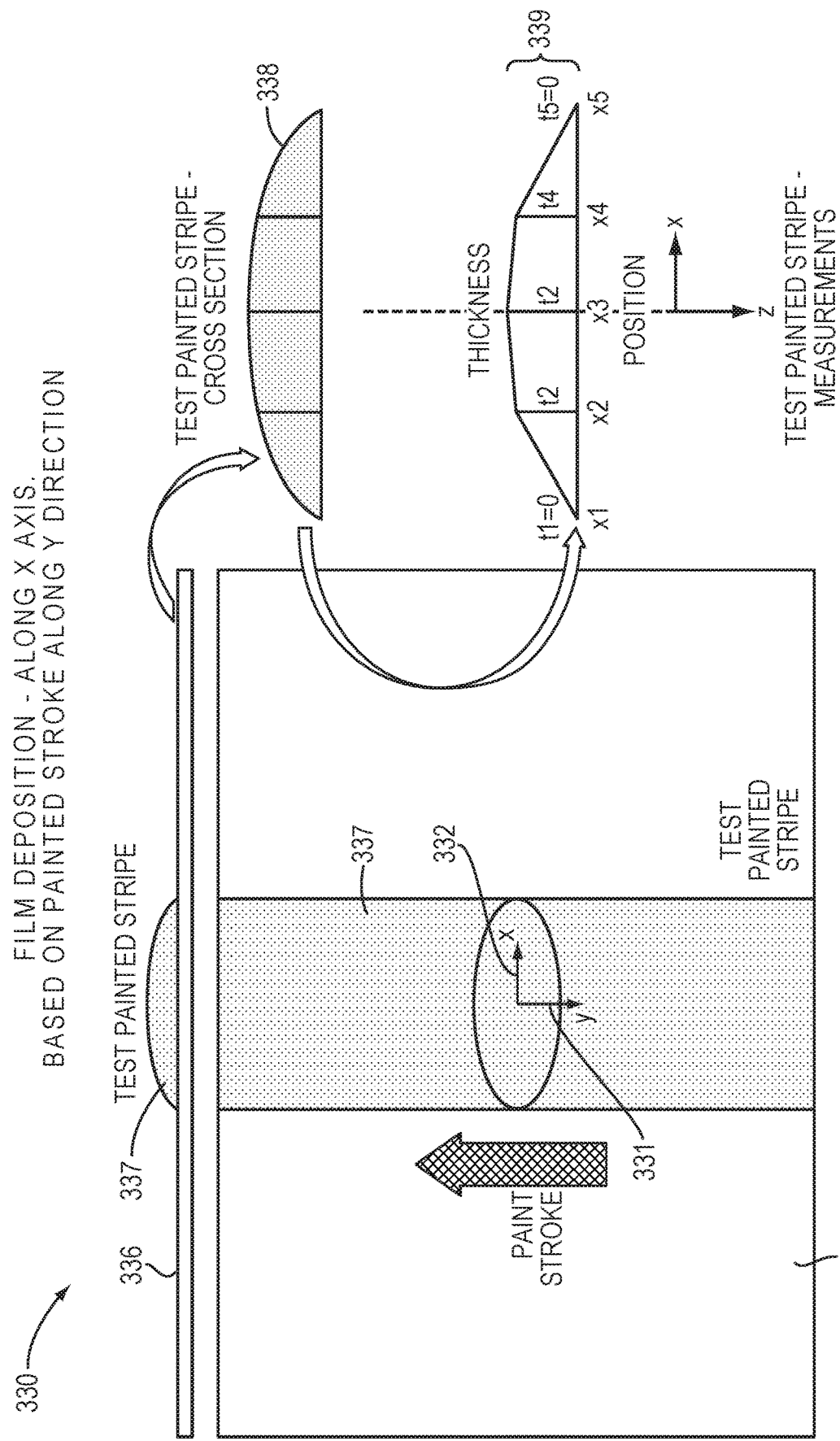
FIG. 3 illustrates a step of paint gun calibration and the resulting calibration measurements for an embodiment.
Figure 4:
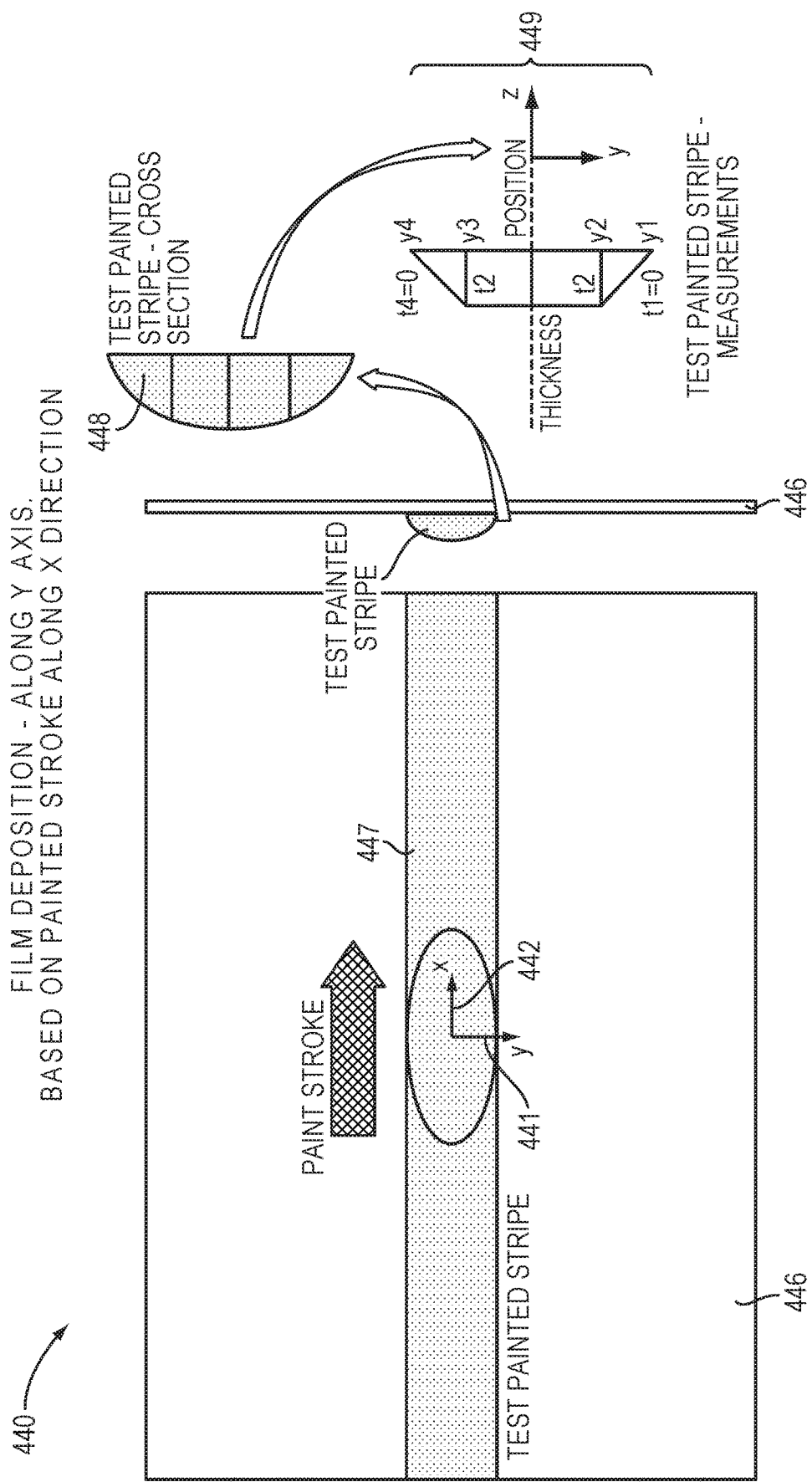
FIG. 4 portrays a step of paint gun calibration and the resulting calibration measurements according to an embodiment.

FIGS. 3 and 4 illustrate the direct paint accumulation calibration experiment for determining the paint gun calibration through moving the paint gun in the y-direction 330 and moving the paint gun in the x-direction 440, respectively. FIG. 3 depicts the calibration set-up 330 to determine paint thickness in the x-axis 332. In the set-up 330, the paint gun is moved along the y-direction 331 and paint is deposited on the plate 336 which yields a paint stripe 337 with the cross section 338. The cross section 338 is measured at the positions 339 to determine paint thickness in the x-axis 332 of the stripe 337. FIG. 4 depicts the calibration set-up 440 to determine paint thickness in the y-axis 441. In the set-up 440, the paint gun is moved along the x-direction 442 and paint is deposited on the plate 446 which yields a paint stripe 447 with the cross section 448. The cross section 448 is measured at the positions 449 to determine paint thickness in the y-axis 441 of the stripe 447. The measurements taken at the positions 339 and 449 are used in embodiments to determine direct paint accumulation.

To illustrate, according to an embodiment, during simulation the paint gun calibration measurements are used to compute the paint accumulation at each time step for each tessellated finite element triangle on a geometric surface that is being painted with a mathematical extrapolation approach. An example extrapolation approach calculates relative distance and inclination from the nozzle of an element using the location of the simulated element being painted relative to the location of the simulated paint gun at a given instance in time being simulated. This calculation is then used to map the simulated point being painted by following the expected paint flow stream lines to the point on the measured paint stripes from the actual paint gun calibration experiment. Then, to continue the computation, if all parameters of the system being simulated are the same as the parameters used in the calibration experiment, the paint deposition thickness in the simulation matches the paint deposition from the experiment.

However, extrapolation needs to be performed to adjust the calculated deposition if the simulation conditions, i.e., parameters, are different from the conditions used in the calibration experiment. To implement the extrapolation, the calculated paint deposition is varied by comparing the simulation with the experiment. Example extrapolations include: (1) modifying deposition directly proportional to the comparison of the paint flow rate, (2) modifying deposition directly proportional to the comparison of the percentage solids in the paint, (3) modifying deposition directly proportional to the comparison of the paint gun efficiency, (4) modifying deposition inversely proportional to the comparison of the square of the distance from the nozzle to the painted point/element, and (5) modifying the deposition inversely proportional to the comparison of the cosine of the angle between the direction normal of the simulated finite element relative to the direction of the paint flow stream arriving from the nozzle on to the surface.

Further, it is noted that if, for example, the paint gun being simulated has a spray cone with a circular base, then only a single stripe needs to be painted in the calibration experiment and a single set of measurements is taken and used in embodiments.

The above described method for paint simulation and experimental calibration only account for the direct flow of paint from a paint gun to a subject object that is being painted. Embodiments described herein go beyond direct paint accumulation and simulate and determine the electrostatic effect for painting in addition to normal direct spray painting effects.

Figure 5:
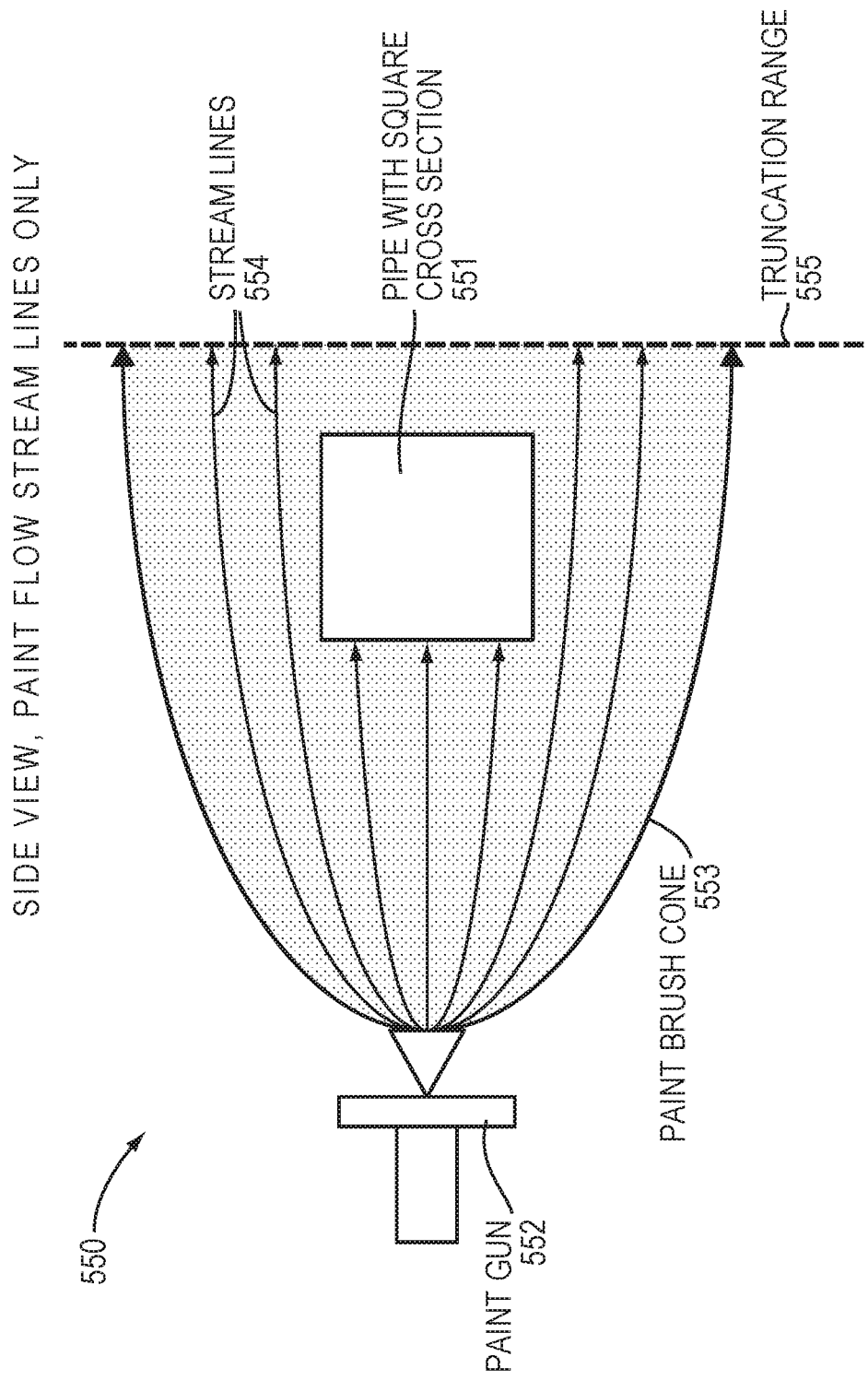
FIG. 5 depicts conceptually the direct paint flow streams for a paint gun used in an embodiment.

FIG. 5 is a side view 550 illustrating painting the part 551 where only the direct paint flow is depicted. In the view 550, the paint gun 552 sprays paint with the spray cone 553 that is comprised of the paint stream lines 554 at the part 551. Further, as depicted in the view 550, the paint spray is stopped at the truncation range 555, e.g., the distance from the paint gun where it is assumed the paint stops.

Figure 6:
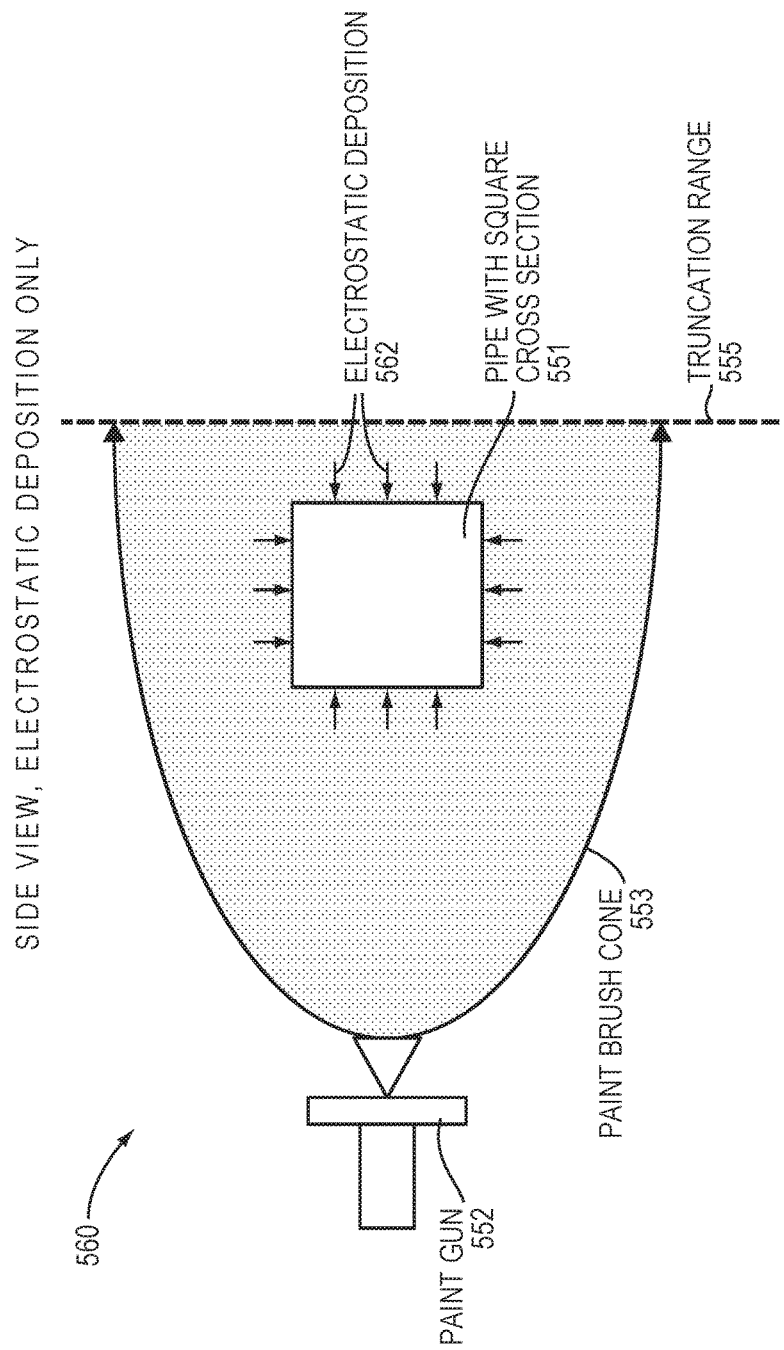
FIG. 6 depicts conceptually the electrostatic paint flow for a paint gun used in an embodiment.

FIG. 6 is a side view 560 illustrating painting the part 551 where only the electrostatic paint deposition is depicted. In the view 560, the paint gun 552 sprays paint with the spray cone 553 at the part 551 and electrostatic paint deposition 562 accumulates on the part 551. Further, as depicted in the view 550, in the view 560, the paint spray is stopped at the truncation range 555.

Figure 7:
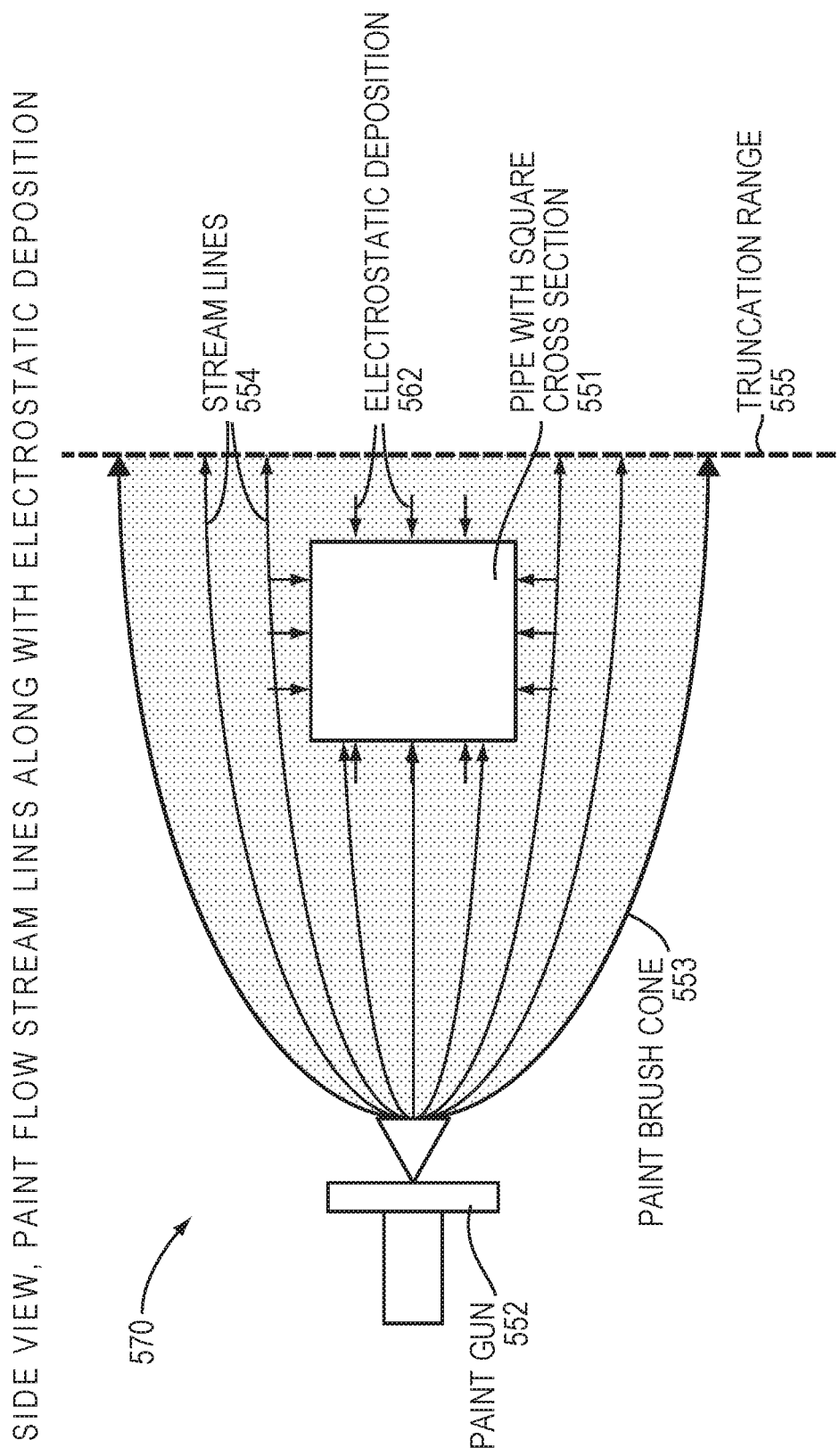
FIG. 7 illustrates the superposition of the direct and electrostatic paint flow streams for a paint gun that may be simulated using embodiments.

FIG. 7 is a side view 570 illustrating painting the part 551 where both the direct paint deposition and electrostatic paint deposition are depicted. In the view 570, the paint gun 552 sprays paint with the spray cone 553 at the part 551 and paint accumulates via direct flow 554 and via electrostatic deposition 562 on the part 551. Embodiments of the present invention simulate and determine paint deposition for electrostatic paint guns by accounting for both the direct paint flow 554 and the electrostatic deposition 562.

The electrostatic painting process includes applying a voltage to the paint gun which results in an electrical charge on the paint particles that attracts the paint to not only the front but also the sides (e.g., left, right, top, and bottom, etc.) and back of the painted object. For electrostatic painting to work, the object being painted is typically of a conductive type material such as metal, and the object is electrically grounded. The behavior of the electrostatic paint gun is also affected by additional parameters such as the speed of its spinning paint disc and the pressure and volume of the shaping air flow that are applied to the gun and, thus, embodiments, may also account for these parameters when determining paint accumulation. According to an embodiment, these parameters are accounted for by adjusting the parabolic shape of the paint cone and the associated paint stream lines. In embodiments, this may include (1) the diameter of the parabolic paint cone being inversely proportional to the electrostatic voltage applied, (2) the diameter of the parabolic paint cone being directly proportional to the speed of the spinning paint disc, (3) the diameter of the parabolic paint cone being inversely proportional to the pressure of the shaping air flow, and (4) the diameter of the parabolic paint cone being inversely proportional to the volume of the shaping air flow.

The spray cone for the electrostatic case is actually a spray zone that is a parabolic flow shape that is influenced by the aforementioned parameters. The parabola has a circular cross section and the painting properties of the spray are related to a deposition profile which can be determined using a calibration experiment that is similar to the methods described hereinabove in relation to FIGS. 2-4. Further, during simulation for a painted surface in the path of the parabolic flow lines of the paint streams, the deposition can be calculated similarly to the approach done for air guns. Thus, in an embodiment, the electrostatic painting simulation mathematical model is an enhancement of the air gun spray mathematical model described hereinabove.

Unlike existing methods, in the case of electrostatic paint deposition, the spray zone maximum height for the electrostatic truncation range is not limited to where it reaches the surface of the painted part but, may go beyond so as to affect painting on the sides (left, right, top, bottom, etc.) or behind the part. In embodiments, the truncation range can be user selected as in the case of the air gun approach. The innovative functionality provided by embodiments determines the deposition due to the electrostatic effect that attracts paint particles from all directions on all surfaces of the part independent of the parabolic flow lines of the paint streams, i.e., the direct paint streams 554.

Embodiments may employ a mathematical model which assumes non-flow based electrostatic paint deposition goes linearly from zero to a maximum with increasing spraying time. This maximum electrostatic contribution to paint deposition thickness may be referred to herein as Tes_max and simply, is an indication of maximum electrostatic paint accumulation. In addition, the rate of electrostatic paint deposition per unit time may be referred to herein as Tes_rate and simply, is an indication of electrostatic paint deposition rate. Hence, the model implies that the non-flow electrostatic contribution at any point on the painted surface goes from zero at a rate of Tes_rate per second until it reaches the maximum contribution Tes_max.

Electrostatic related deposition can happen on part surfaces facing in any direction so long as the part surfaces are within the parabolic spray zone up to the electrostatic truncation range distance. However, there needs to be an open path within the shape of the spray zone for the paint particles to travel to that portion of the part surface being affected. In an embodiment, electrostatic paint deposition is determined and accounted for in addition to the normal computations of paint deposition due to the conventional parabolic flow lines of the paint streams that are based on the spray zone properties determined by the traditional paint gun calibration experiments as described herein above in relation to FIGS. 2-4.

Figure 8:
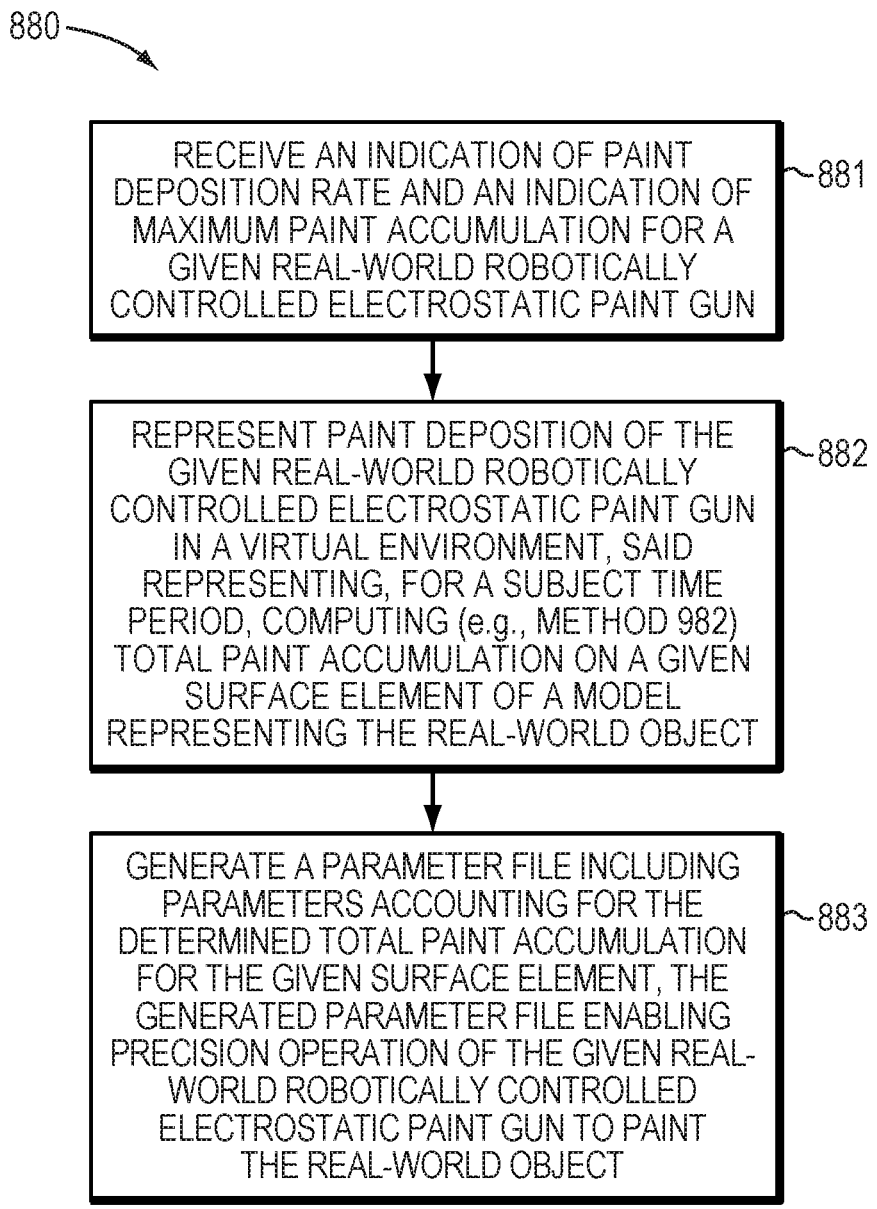
FIG. 8 is a flow chart of a method for simulating electrostatic painting on a real-world object according to an embodiment.

FIG. 8 illustrates a method 880 according to an embodiment that simulates electrostatic painting on a real-world object. The method 880 begins at step 881 by receiving an indication of paint deposition rate and an indication of maximum paint accumulation for a given real-world robotically controlled electrostatic paint gun. According to an embodiment, the indication of paint deposition rate is the rate of electrostatic paint deposition that results from the given real-world robotically controlled electrostatic paint gun, and the indication of maximum paint accumulation is an indication of maximum electrostatic contribution to paint deposition thickness that may occur. In an embodiment, the indication of paint deposition rate and the indication of maximum paint accumulation are thresholds indicating paint deposition rate and maximum paint accumulation. According to an embodiment, the indication of paint deposition rate may be Tes_rate as described herein and the indication of maximum paint accumulation may be Tes_max as described herein. Further still, according to an embodiment, the indication of paint deposition rate and the indication of maximum paint accumulation are determined using a real-world paint gun calibration experiment as described herein, such as the functionality described herein in relation to FIGS. 10-12.

Further still, in embodiments, at step 881, the indication of paint deposition rate and the indication of maximum paint accumulation may be received via any method known in the art from any device, storage component or the like that is communicatively coupled, or capable of being communicatively coupled to a computing device implementing the method 880. Moreover, step 881 may further include storing the received indication of paint deposition rate and the indication of maximum paint accumulation in memory associated with or communicatively coupled to a processor or computing device implementing the method 880.

The method continues at step 882 by representing paint deposition of the given real-world robotically controlled electrostatic paint gun in a virtual environment. In such an embodiment, representing paint deposition at step 882 includes, for a subject time period, computing total paint accumulation on a given surface element of a model representing the real-world object. In this way, at step 882, the virtual environment, e.g., the simulation environment, is used to compute total paint accumulation that would occur on the real-world object if the real-world object is painted in the real-world using the real-world robotically controlled electrostatic paint gun being simulated. In embodiments, the model representing the real-world object may be any computer based model known in the art, e.g., a finite element model or a CAD model, amongst others. According to yet another embodiment, the model is a finite element model and the given surface element is a given tessellated element of the finite element model.

Figure 9:
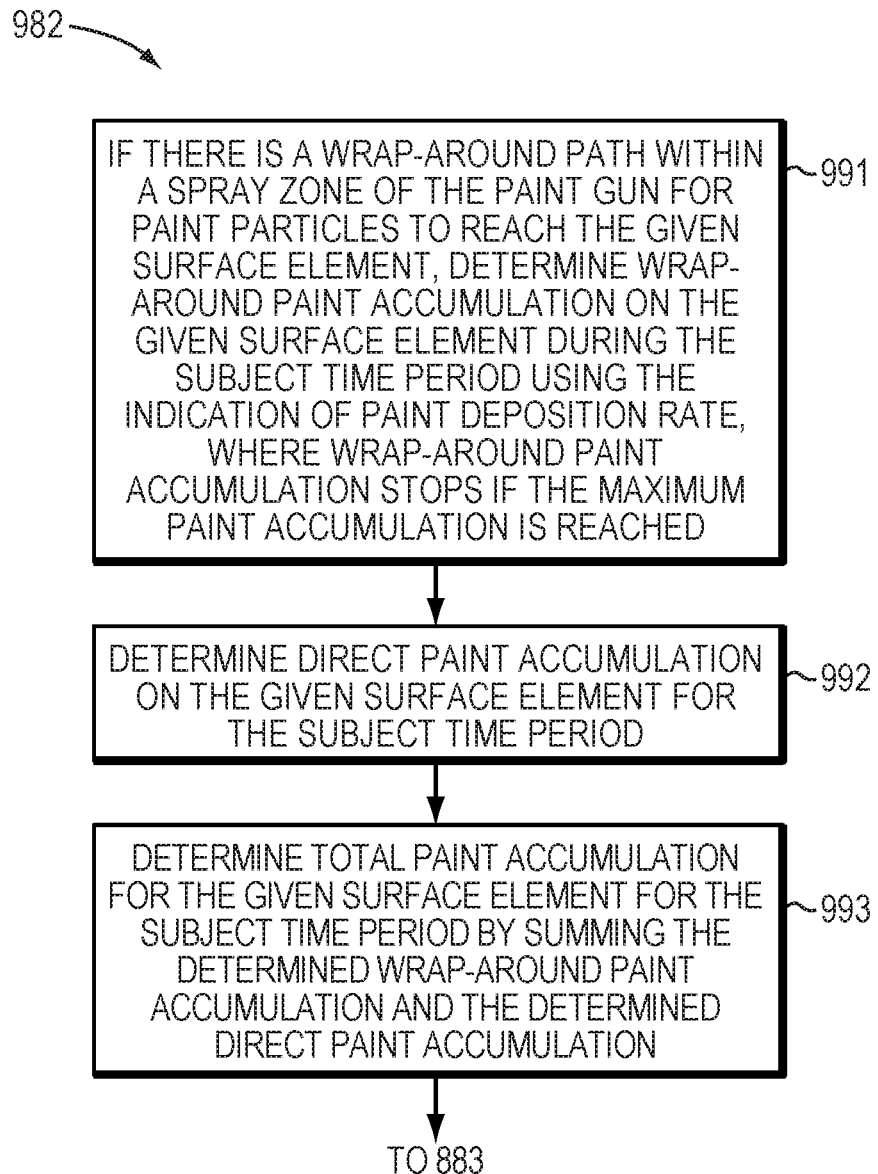
FIG. 9 is a flow diagram of a method for computing total paint accumulation that may be employed in embodiments.

According to an embodiment of the method 880, total paint accumulation is determined at step 882 using the method 982 depicted in FIG. 9. The method 982 begins at step 991 by determining electrostatic paint accumulation on a given surface element during the given time period. Determining electrostatic paint accumulation at step 991 first identifies if there is a wrap-around path within a spray zone of the paint gun for paint particles to reach the given surface element. In other words, it is determined at step 991 if electrostatic paint particles can reach the given surface element during the subject time period. Further, it is noted that while the method 991 determines if there is a "wrap-around" path, embodiments are not so limited and step 991 determines electrostatic paint accumulation if there is any path, i.e., a direct path for paint to reach the surface element. To continue, if there is a path for paint particles to reach the surface elements, electrostatic, i.e., wrap-around, paint accumulation on the given surface element during the subject time period is determined at step 991 using the indication of paint deposition rate, where wrap-around paint accumulation stops if the maximum paint accumulation is reached. Thus, the paint deposition rate is used to determine electrostatic paint deposition, and electrostatic paint deposition is capped at the maximum paint accumulation. To illustrate, consider an example where the paint deposition rate is 1 cm/second and maximum paint accumulation is 1.5 cm. During the first time period, which is one second, the electrostatic/wrap-around paint deposition is 1 cm. If, for example, another one second time period is simulated, the electrostatic paint accumulation during the second time period would only be 0.5 cm because 0.5 cm of paint would accumulate in the first 0.5 seconds and the maximum paint accumulation of 1.5 cm would be reached.

Continuing the method 982, after determining the wrap-around paint accumulation at step 991, direct paint accumulation on the given surface element for the subject time period is determined at step 992. Direct paint accumulation is determined at step 992 using any methods known in the art and/or any methods described herein. For instance, in an embodiment, paint gun calibration measurements are used to compute the paint accumulation at each time step for each tessellated finite element triangle on the geometric surface that is being painted using an extrapolation approach.

Next, at step 993 total paint accumulation for the given surface element for the subject time period is determined by summing the determined wrap-around paint accumulation (results of step 991) and the determined direct paint accumulation (results of step 992). Simply, in an embodiment, the wrap-around paint accumulation output from step 991 and the direct paint accumulation output from step 992 are added together at step 993 to determine the total paint accumulation for the given surface element for the subject time period. The output of step 993 (the determined total paint accumulation) is employed as results of step 882.

Returning to FIG. 8, after computing total paint accumulation on a given surface element of a model at step 882, the method 880 continues and, at step 883, generates a parameter file that includes parameters accounting for the determined total paint accumulation for the given surface element. In such an embodiment, the generated parameter file enables precision operation of the given real-world robotically controlled electrostatic paint gun to paint the real-world object. For instance, in an embodiment, the parameter file includes controls for the electrostatic paint gun to paint the real-world object according to desired paint settings.

An embodiment of the method 880 further comprises receiving an indication of desired paint accumulation for the given surface element and, in such an embodiment, generating the parameter file further includes determining paint process settings to control the given real-world electrostatic paint gun to attain the desired paint accumulation for the given surface element. Further, in such an embodiment of the method 880, the determined paint process settings are included in the parameter file of step 883. Such an example embodiment may further include transmitting the generated parameter file, including the determined paint process settings, to the given real-world robotically controlled electrostatic paint gun, where the transmitting causes the given real-world robotically controlled electrostatic paint gun to paint the real-world object in accordance with the determined paint process settings.

According to an example embodiment of the method 880, the paint process settings include at least one of: speed of the given real-world robotically controlled electrostatic paint gun, path of the given real-world robotically controlled electrostatic paint gun, and distance between the real-world object and the given real-world robotically controlled electrostatic paint gun. Thus, in such an embodiment, the aforementioned settings of the paint gun may be determined in the method 880 and the settings are sent to the paint gun which will then operate in accordance with the settings. In such an embodiment, values of the paint process settings that achieve a desired paint accumulation may be determined based upon the computed paint accumulation in step 882. The paint process settings may be determined by repeating the processing of the method, i.e., the steps 882 and 883, for example, iteratively, so that optimized settings can be determined which achieve desired paint accumulation. In another embodiment, the steps 882 and 883 may be iterated indefinitely (for any number of time periods) until desired paint accumulation is achieved and settings are included in the parameter file that achieve the desired paint accumulation.

An alternative embodiment of the method 880 includes receiving paint process parameters. In such an embodiment, the paint process parameters include at least one of: paint parameters, position parameters, and calibration parameters. These parameters may then be used in step 882 of the method 880 to determine paint accumulation. Further details regarding paint process parameters are described hereinbelow in relation to FIGS. 13 and 14.

It is noted that while the method 880 is described hereinabove as being performed in relation to a given surface element for a subject time period, embodiments of the method 880 are not so limited. Embodiments of the method 880 may be configured to determine paint accumulation for any number of surface elements of interest, e.g., all of the surface elements of a subject part. Further, embodiments of the method 880 may be utilized to simulate paint deposition for any number of time periods of interest. Further still, an embodiment of the method 880 further includes receiving an indication of surface elements of interest, i.e., an indication of surface elements for which it is desired to simulate/determine paint accumulation. Likewise, an embodiment further includes receiving an indication of a time period of interest or an indication to continue the method until desired paint accumulation is determined.

Another embodiment of the method 880 computes total paint accumulation for the given surface element for a plurality of time periods that compose total time for a painting process. In this way, such an embodiment determines paint accumulation for the given surface element for an entire painting process. Further, in such an embodiment, because total paint accumulation for the given surface element for the painting process is determined, the parameter file can likewise be generated to include parameters that account for the entire painting process.

Yet another embodiment of the method 880 computes total paint accumulation on a plurality of surface elements of the model representing the real-world object for a plurality of time periods which compose the total time for a painting process. In this way, such an embodiment of the method 880 determines total paint accumulation for each of the plurality of surface elements for the painting process. Such an embodiment may further include receiving an indication of desired paint accumulation for each of the plurality of surface elements and, in such an embodiment, generating the parameter file further includes determining paint process settings to control the given real-world electrostatic paint gun to attain the desired paint accumulation for each of the plurality of surface elements during the painting process and including the determined paint process settings in the parameter file.

Another embodiment of the method 880 further comprises iterating determining the paint process settings to determine optimized paint process settings that attain the desired paint accumulation for each of the plurality of surface elements during the painting process. Such an embodiment may further include automatically iterating determining paint accumulation for different paint process settings. Yet another embodiment of the method 880 includes displaying an indication of the determined total paint accumulation based on the generated parameter file. In such an embodiment, for example, the determined paint accumulation may be portrayed to a user through, for example, color or shade coding, distribution, graphing, or mapping, or the like.

In embodiments of the method 880, a user may specify the surface elements for which paint accumulation should be determined and the user may also provide parameters for the paint process. For instance, a user may indicate the time for the paint process and may provide any details regarding the object being painted, the robot being used, and any other information needed for computing the paint accumulation. For example, a provided time duration indicates the cycle time required to run the robot painting program to be used. The user may specify the object being painted for example, the front hood, from among the CAD model of the entire simulated vehicle. Similarly, details regarding the robot being used may indicate a specific model such as a FANUC P-500iA industrial robot with the robot's particular kinematic properties. Other information that may be specified includes the paint gun calibration experimental data and the corresponding application parameters for paint flow rate, percentage solids, and paint gun efficiency for the simulation.

A paint gun calibration method for determining paint settings for direct paint accumulation is described hereinabove in relation to FIGS. 2-4. Embodiments may utilize the functionality described in relation to FIGS. 2-4 in computing direct paint accumulation. Further, embodiments may employ a paint gun calibration experiment to determine paint gun parameters needed to determine electrostatic paint accumulation as described herein. In contrast to the calibration technique described in relation to FIGS. 2-4, the electrostatic paint zone base is typically circular and not elliptical and, thus, it is sufficient to paint just one test stripe and use those same measurement numbers for a deposition profile in the orthogonal direction. For example, during simulation, the paint gun calibration measurements may be used to compute the paint accumulation at each time step for each tessellated finite element triangle on the geometric surface that is being painted using an extrapolation approach. This information (the paint deposition measurements for the electrostatic paint gun) may be used in embodiments in a similar manner as paint deposition measurements are used in existing air gun painting simulation methods to predict the deposition due to geometric paint flow lines intersecting with the painted object. Further, it is noted that while it is described that the electrostatic paint zone base is typically circular, embodiments are not so limited, and embodiments may modify the calibration techniques described herein to accommodate any variety of spray base shapes.

Figure 10:
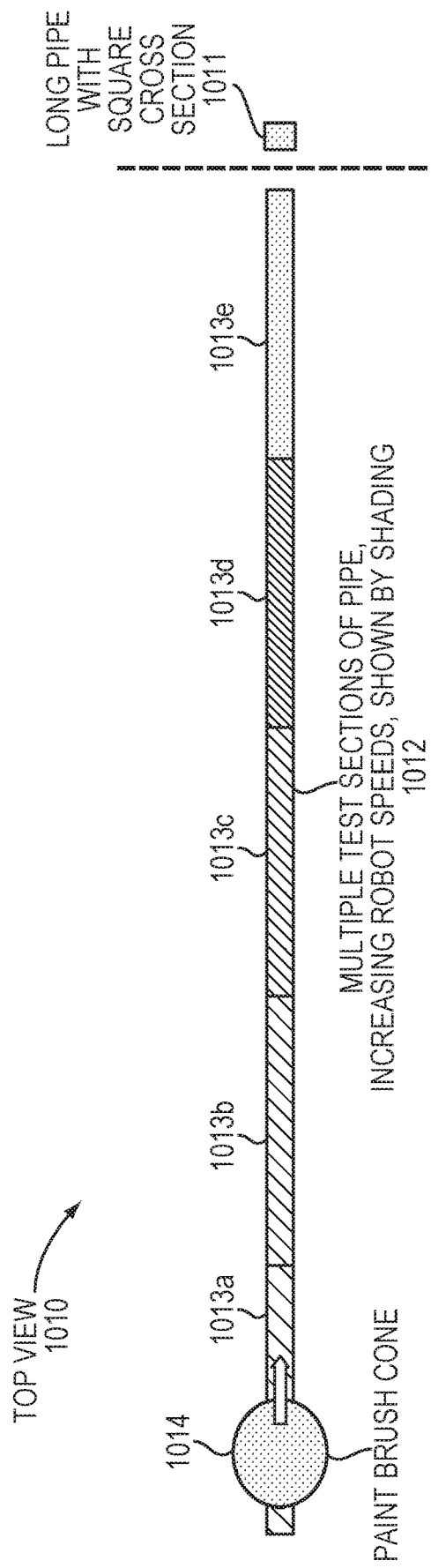
FIG. 10 is a graphical depiction of a method for electrostatic paint gun calibration that may be employed in embodiments.
Figure 11:
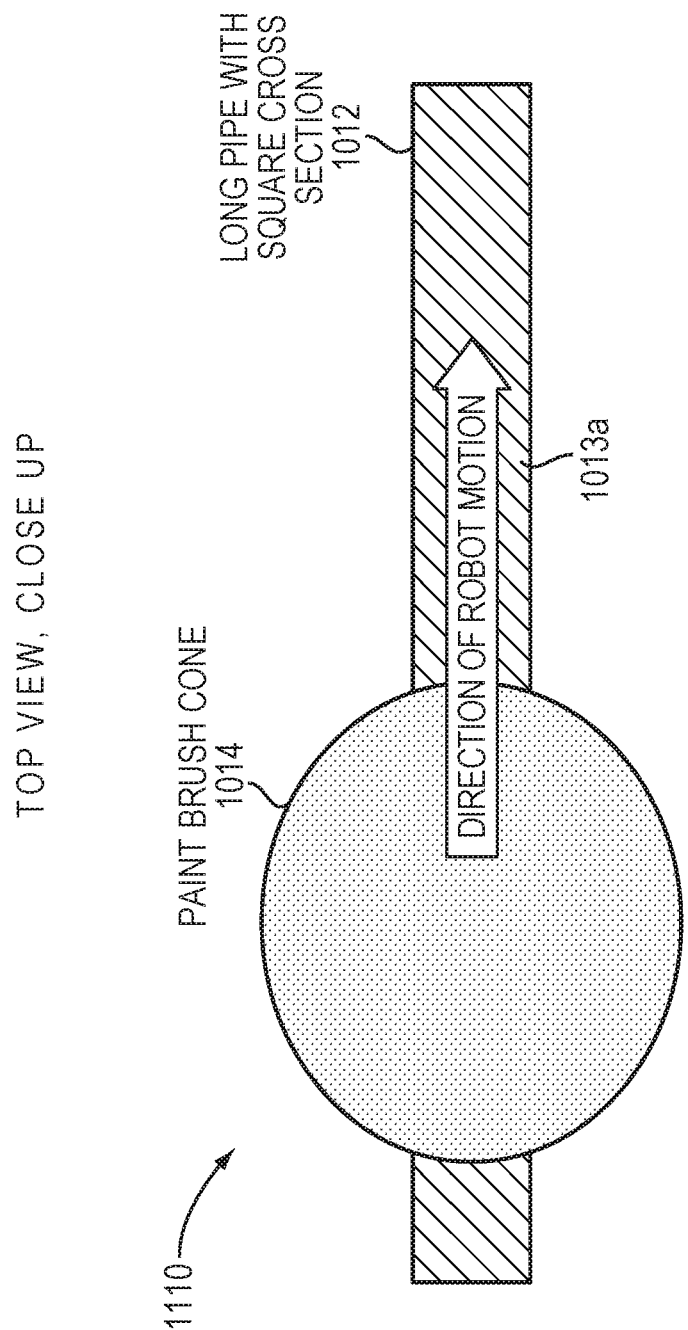
FIG. 11 is a close-up portrayal of the paint gun calibration technique depicted in FIG. 10.
Figure 12:
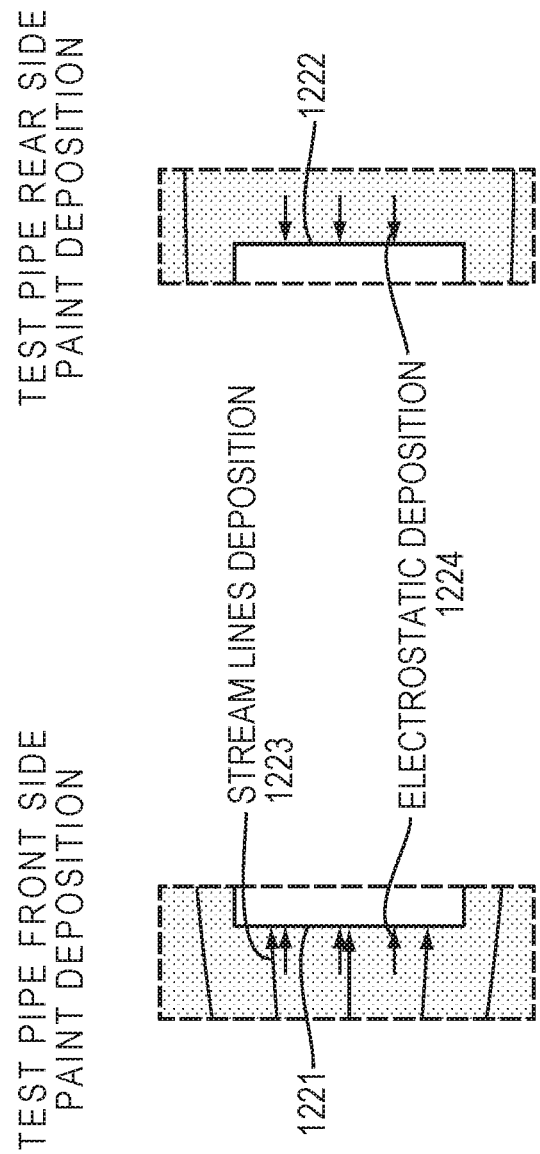
FIG. 12 illustrates front side and rear side paint deposition that occurs in calibration methods employed by embodiments.

Embodiments may leverage a new innovative technique for calibrating and experimentally determining properties of an electrostatic paint gun so that painting with the paint gun can be simulated. FIGS. 10-12 are illustrative. FIG. 10 depicts a top view 1010 of a paint gun calibration experiment that may be employed by embodiments to determine properties of a paint gun that is being simulated. In the paint gun calibration experiment portrayed in FIG. 10, instead of painting a stripe on a flat plate, a long pipe 1012 with a square cross section 1011 is painted. The dimensions of the pipe and its cross section are chosen based on the height and width of the electrostatic spray zone and properties of the particular gun being calibrated. In an example approach, the dimension of the sides of the square pipe cross section are in the range of one half to one third of the diameter of the paint cone at its truncation range so that the pipe is large enough to block some of the stream flow lines from reaching the back of the square pipe but, small enough to fit completely inside the paint cone. The pipe 1012 is painted in multiple sections 1013a-e along the length of the pipe 1012. For each of the sections 1013a-e, the robot speed is increased in steps from slow to fast while moving along the pipe 1012 while painting the pipe 1012 with the paint gun with the spray cone 1014. According to an embodiment, the robot moves at its minimum anticipated application speed when the robot is in the pipe zone 1013a and, the speed of the robot is increased as the robot moves down the pipe and, in the final zone 1013e, the robot is moving at its maximum anticipated application speed. After the test is completed and the paint has dried, the paint thickness is measured not on the front but rather, on the back side of the square cross section 1011.

FIG. 11 is close-up view 1110 of the calibration experiment depicted in FIG. 10. FIG. 11 illustrates painting the section 1013a of the pipe 1012 using the paint gun with the paint brush cone 1014.

FIG. 12 are plan views that depict paint deposition on the front side 1221 and on the backside 1222 for the pipe 1012 being used in the calibration experiment depicted in FIGS. 10 and 11. For the front side 1221, paint deposition results from direct stream paint flow 1223 and the electrostatic deposition 1224. For the backside 1222 of the pipe 1012, paint deposition only results from the electrostatic paint flow 1224. To determine paint accumulation characteristics for the front side 1221, a test is run as described above by painting a stripe at a known paint flow rate. To determine electrostatic paint accumulation characteristics, the pipe 1012 is painted as described in relation to FIG. 10 and the dried paint on the backside 1222 is measured at multiple points, e.g., the center of each section painted at a given speed, along the length of the back side of the pipe to tabulate the Tes_max and Tes_rate parameters that identify the deposition profile which characterizes the wraparound deposition aspect of the particular paint gun being simulated.

In an embodiment, the back side paint thickness measured in the pipe section painted at the slowest robot speeds gives the value of the maximum electrostatic wraparound paint accumulation, i.e., Tes_max. The back side thickness in the pipe sections painted at the faster speeds gives the rate of electrostatic wraparound deposition per unit time, i.e., Tes_rate. Thus, in an embodiment, the Tes_rate is selected/extrapolated based on the measurements from the calibration experiment. To illustrate, if the calibration experiment determines that back side thickness is 50 microns (0.05 mm) in the zone where the robot was moving the paint gun at a speed of 100 mm/sec, then for a representative 1 mm section of the back side, the painting exposure time would be 0.01 seconds. This would imply that Tes_rate is 50 microns per 0.01 seconds which comes to 0.5 mm/sec. Hence, during simulation, for each tessellated surface triangle being processed, if the delta time exposure for that triangle is 0.01 seconds then the extent of wraparound electrostatic deposition effect would be 50 microns, and the computation would be proportional, so that, for example, an exposure of 0.005 seconds implies electrostatic wraparound deposition of 25 microns.

According to an embodiment, for the duration of the simulation time step, the possible additional electrostatic wraparound deposition is computed, as detailed in the illustration above, based on the rate, Tes_rate, multiplied by the delta time for the given step. However, if the electrostatic wraparound deposition effect running total reaches the electrostatic maximum, Tes_max, then according to an embodiment, any further wraparound deposition at this particular triangle is no longer added to the total paint accumulation for the particular triangle, i.e., surface element.

The intention behind this test is that since the back side 1222 of the test pipe cannot be hit by the direct flow lines 1223 of paint spray, the deposition on the backside 1222 is caused by the wraparound electrostatic effect (deposition 1224) working by itself. By choosing appropriate robot speeds for the pipe sections 1013*a-e* painted in the test, it is possible to determine electrostatic paint deposition rate and maximum electrostatic paint accumulation characteristics for the paint gun and then, in turn, use these determined rates when simulating the paint gun.

The back side 1222 paint thickness measured in the pipe section painted at the slowest robot speeds gives the value of the maximum electrostatic wraparound paint accumulation, i.e., Tes_max. The back side 1222 paint thickness in the pipe sections painted at the faster speeds gives the rate of electrostatic wraparound deposition per unit time, i.e., Tes_rate.

An embodiment utilizes the parameters, i.e., Tes_max and Tes_rate, in a simulation to determine paint accumulation at each time step for each tessellated triangle on a surface that is being painted. An example embodiment first checks if a particular surface triangle being processed is inside the dimensions of the electrostatic spray zone at the particular time step in the simulation.

Next, the thickness of the paint film that is deposited on that triangle for this time step due to the electrostatic wraparound effect is computed. Determining electrostatic deposition includes: (1) determining if there is an unobstructed path within the spray zone for paint particles from the paint gun to reach the surface location, (2) if there is a path, using the current time step duration and the electrostatic wraparound deposition rate Tes_rate to compute the addition to thickness during this time step, (3) adding the computed thickness for the time to the running total of electrostatic wraparound deposition for this triangle since the start of the simulation, and (4) if the running total has reached the electrostatic maximum, Tes_max, then stopping adding any further wraparound deposition amounts at this particular triangle.

In turn, such an embodiment computes the thickness of the paint film that is deposited on the triangle for the time step based on conventional considerations of the direct flow lines of paint spray. The above two computed deposition thickness (electrostatic paint flow and direct paint flow) for this time step for this triangle are then summed and added to the running total of determined paint accumulated on this triangle for the ongoing simulation.

Such an embodiment may also visually depict the robot motion and the paint accumulation over time. The paint deposition may be visualized in color or shade coded contours depicted on a graphical model of the object being painted.

In embodiments, similar to air gun simulation, the paint thickness computation is based on the concepts of geometric spray projection combined with the experimentally measured properties of the paint gun. These computations include the typical simulation parameters such as the paint gun calibration properties, paint flow rate, the percentage solids in the paint, the user defined paint gun efficiency, the distance and the location of the paint nozzle relative to the surface triangle being painted, and the position and normal direction of the surface triangle relative to the direction of the spray. In addition, the electrostatic paint gun behavior direct flow computation may also account for additional parameters, such as, voltage of the electrostatic potential, the speed of the paint gun's spinning paint disc and the pressure and volume of the shaping air flow that are applied to the gun.

Embodiments can be used to help simulation engineers plan for manufacturing processes and to predict the quantitative and qualitative finishing results of robotic painting. In such an embodiment, the simulation is built up from various powerful technologies, including generation of robotic paths for the painting strokes based on the geometry of the surface being painted, modeling of the paint brush spraying behavior, meshing of the surface of the painted part for deposition resolution, and computations for determining the paint deposition thickness and statistics while painting a complex meshed surface at different paint and simulation settings. In such an embodiment, the computations for determining paint deposition and thickness may be performed as described herein, e.g., using the method 880 of FIG. 8.

Embodiments may also account for multiple paint brushes as well as multiple painted parts to be simultaneously moving under different influences such as painting robots on rails and painted vehicles on moving conveyor lines. Further, in such an embodiment, the required paint deposition behavior may be specified by a user through a set of paint brush calibration parameters and painting simulation settings, such as the settings shown in the graphical user interfaces 1330 and 1440 described hereinbelow in relation to FIGS. 13 and 14.

In embodiments that account for multiple paint brushes and multiple painted parts, the simulation of paint deposition is computed in parallel with robot motion planning as well as the conveyor motion, the paint and brush properties, conservation of flow, and computation of the geometric interaction of the paint flow lines of the multiple paint brushes with the mesh resolved shapes and tessellated curvatures of the surfaces being painted.

In another embodiment, the paint brush that is to be used in the painting process is quantified in preparation for the simulation of that paint brush. In one such embodiment, quantifying the paint brush includes performing calibration experiments such as those described herein above in relation to FIGS. 2-4 and 10-12. According to an example embodiment, the calibration experiment performed as described in relation to FIGS. 2-4 is performed to determine properties of the paint gun for direct flow painting and the calibration experiment described in regard to FIGS. 10-12 is performed to determine properties of the paint gun for electrostatic painting. These experiments include painting test stripes and measuring the thickness profile of the deposited paint once it has dried. According to an embodiment, the painting in the experiments is performed from a fixed target distance height above the test object being painted. The paint fluid flow rate through the paint gun being calibrated as well as the percentage solids content information for the paint used are then noted as part of the experiment. In addition to these two parameters, if the paint gun is an electrostatic rotating bell paint gun, then additional note is made of the disk rotation speed, regulation air pressure, regulation air volume, and electrostatic voltage used during the experiment. A user may also specify a shaping factor for each of the above four parameters, disk rotation speed, regulation air pressure, regulation air volume, and electrostatic voltage.

The shaping factor determines the extent to which the parameters cause changes in the electrostatic rotating bell paint spray width. In the case of the disk rotation speed parameter, a default value of 1.0 implies that doubling the disk speed with double the spray width. For each of the remaining three parameters (regulation air pressure, volume, and electrostatic voltage) a shaping factor of 1.0 implies that doubling the parameter will half the spray width. In an embodiment, the test parameters, e.g., properties of the gun used in the test along with the measured paint deposition thicknesses are entered into a calibration profile that can be accessed by a computing device implementing embodiments. FIG. 13 depicts an example calibration profile 1330 where properties of the paint gun being simulated and the measured paint thicknesses from the experiments may be entered. When a computing device is performing an embodiment described herein, e.g., the method 880, the computing device accesses and/or obtains the information in the profile 1330 and uses the information in performing the functionality described herein.

While the calibration experiments are performed using particular settings for the paint gun, embodiments are not limited to simulating the paint gun at these settings. As mentioned above, the paint brush calibration parameters include the paint flow rate, percentage solids, and spraying height during the test. During the simulation, an active paint profile for the paint guns may be updated by a user or automatically, in an optimization simulation, to simulate paint deposition based on different settings. The settings for the simulation include paint flow rate, percentage solids, gun transfer efficiency, and painting range. In addition to these four parameters, if the paint gun is an electrostatic paint gun, then additional settings include disk rotation speed, regulation air pressure, regulation air volume, and electrostatic voltage being used.

Figure 14:
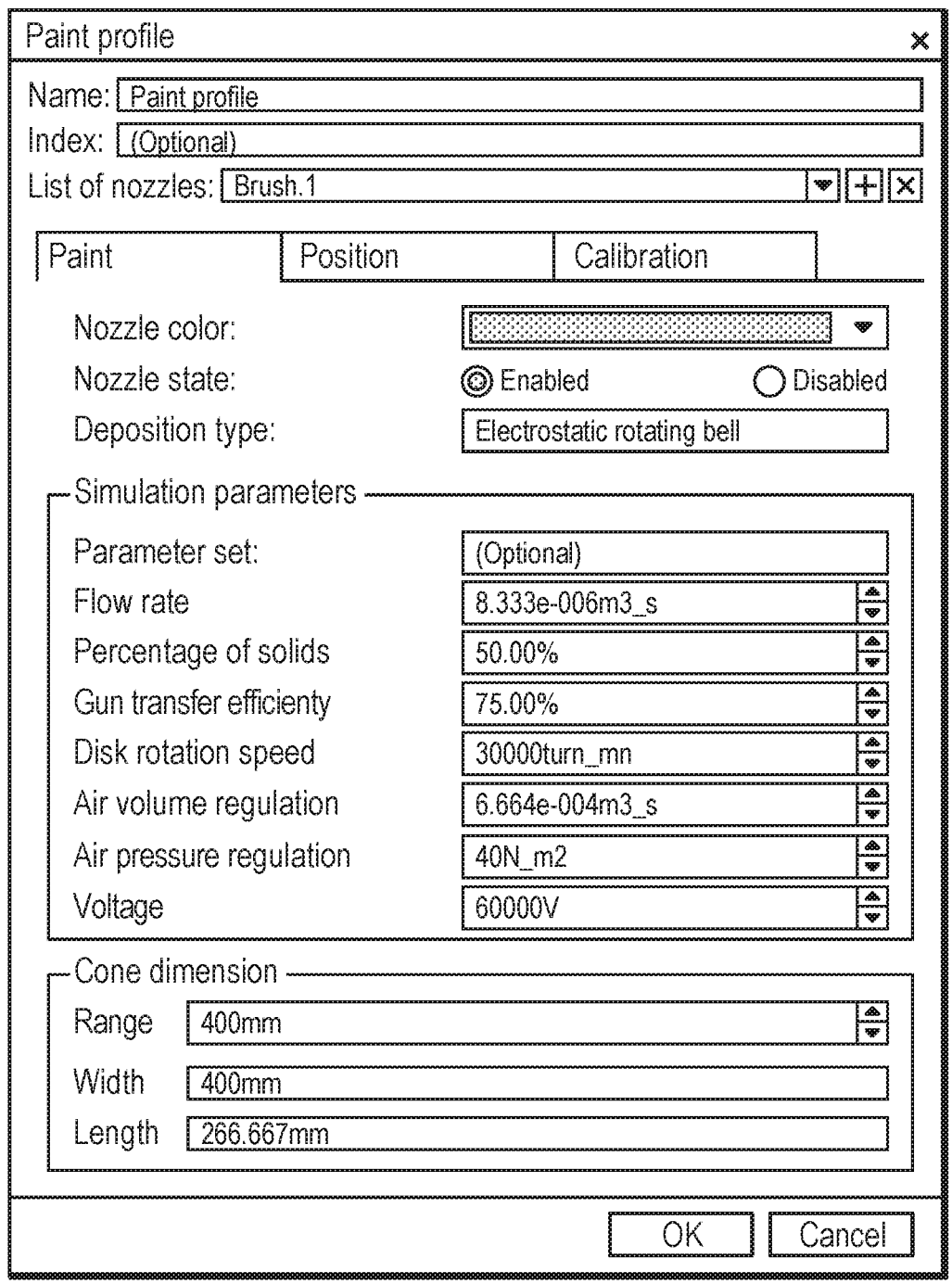
FIG. 14 depicts a graphical user interface in which paint simulation specific parameters used in embodiments are entered.

FIG. 14 depicts an example profile 1440 where properties of the paint gun being simulated may be entered. When a computing device is performing an embodiment described herein, e.g., the method 880, the computing device accesses and/or obtains the information in the profile 1440 and uses the information in performing the functionality described herein.

The flow rate and percentage solids parameters allow the simulation to be performed for paint settings that are different from the calibration experiments. The gun transfer efficiency is a parameter that will override the efficiency of the brush computing using the results of the calibration experiments. In an example embodiment, the simulation will start with the computed efficiency but later, the efficiency can be increased or decreased so as to tune the simulation results to better match the real-world shop floor experience. In such an embodiment, these changes in efficiency may be user driven or may be made automatically as part of an optimization simulation or made automatically based upon real-world data received from real-world painting applications.

In embodiments, a painting range parameter, i.e., truncation range, may also be set for the simulation. The painting range parameter specifies the maximum distance that the spray will cause deposition on the mesh surfaces of the painted parts. Any mesh point beyond this distance will not see any paint deposition and the paint spray beyond that point will be understood to be diffused away and become part of the wasted paint statistic. According to an embodiment, the intention is to specify a range that is some short distance beyond the planned distance between the paint gun and the surface that is being painted during the painting task. By specifying such a range, performance of the paint deposition method is improved because the method will not spend time computing any paint deposition on parts that are far away and not related to the actual painting simulation.

In an embodiment, the initial height of the paint spray cone is based on the target distance from the paint test experiment. Further, in another embodiment, the paint cone is visualized, i.e., displayed, during the simulation with a height that is modified based on settings for painting range. Hence, in such an embodiment, a user can see a visualized paint cone in the color of the ongoing paint and the paint cone will grow longer or shorter as per the current settings while the simulation is progressing.

The painting range related behavior applies to both air brush paint guns as well as electrostatic paint guns. However, the shape of the spray for an airbrush gun will be a scaled elliptical cone while the shape of the spray for an electrostatic paint gun will be a scaled parabolic cone as described herein above in relation to FIG. 1. Further, in embodiments, the settings for the additional parameters for an electrostatic paint gun may be used in the painting solver to affect the spray size width of the parabolic cone. As described herein, the extent of the change in spray width is based on the defined shaping factor for each of the four parameters, disk rotation speed, regulation air pressure, regulation air volume, and electrostatic voltage. Specifically, doubling the current disk rotation speed parameter along with a shaping factor value of 1.0 results in doubling the electrostatic paint spray width during that portion of the simulation. While for each of the remaining three parameters (regulation air pressure, volume and electrostatic voltage), doubling the current parameter (pressure or volume or voltage) along with a shaping factor of 1.0, results in reducing the electrostatic paint spray width by half.

Figure 15A:
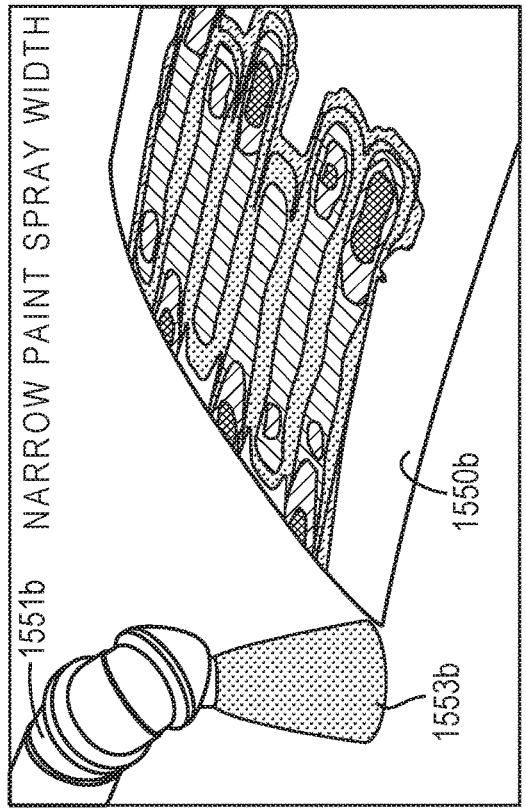
FIGS. 15A-C illustrate possible variations in example results of painting simulations that may be displayed in embodiments.
Figure 15B:
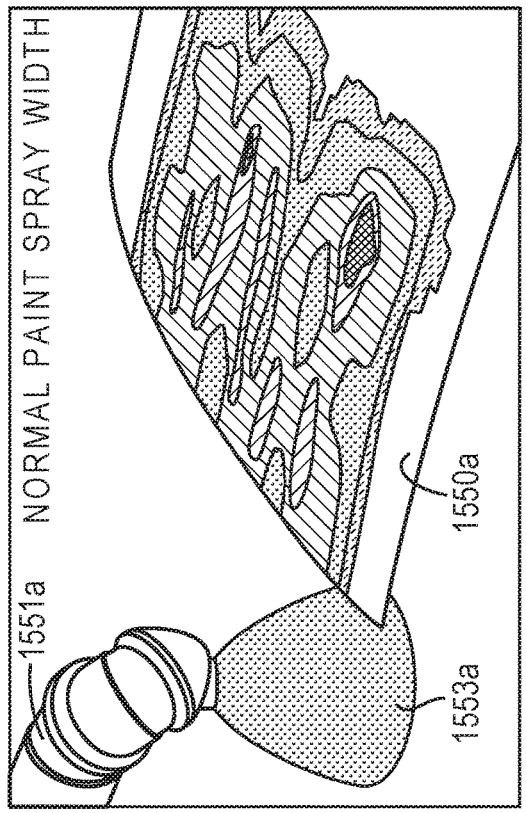
Figure 15C:
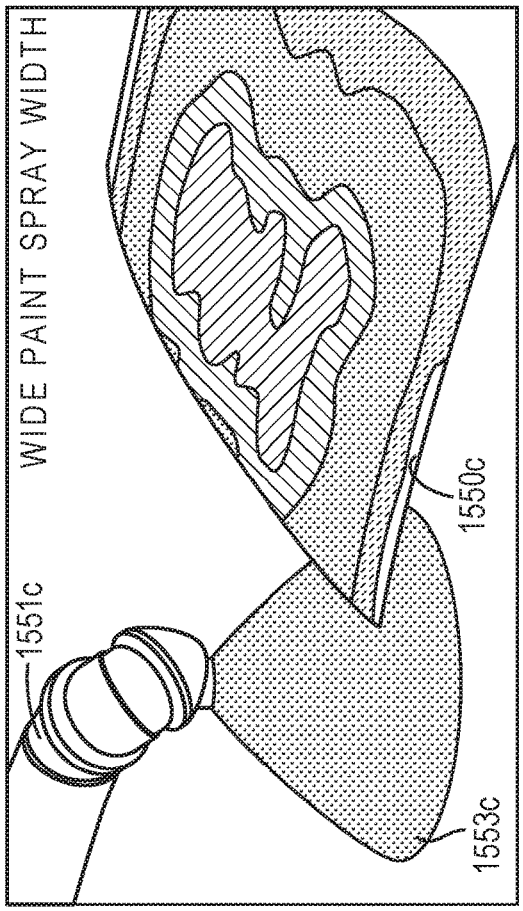

In an embodiment, as the simulation progresses, the determined paint coverage of the object over time is depicted to a user. The dynamic changes in spray width for a paint gun during simulation can influence both the extent of the painting coverage over the workpiece as well as the resulting paint deposition thickness due to the spreading out of the ongoing paint flow rate over a smaller or larger area. Thus, in an embodiment the changes in spray width are also depicted along with the changes in paint coverage. FIGS. 15A-C show an example of this effect during a simulation.

FIG. 15A portrays the object 1550a being painted by the spray paint gun 1551a with a normal width spray cone 1553a. FIG. 15B shows the object 1550b being painted by the spray paint gun 1551b with a narrow width spray cone 1553b. FIG. 15C shows the object 1550c being painted by the spray paint gun 1551c with a wide width spray cone 1553c. FIGS. 15A-C also show paint deposition with shade coding which indicates the thickness of paint on the objects 1550a-c. Further embodiments may also provide a visual animation of the painting process which likewise uses shade or color coding to visualize the paint deposition thickness over time.

According to an embodiment, before running a painting simulation, a user prepares a model of the object to be painted by generating a painting mesh of the object's surfaces. In such an embodiment, the meshing is based on user specified mesh size and mesh sag parameters. These parameters can be chosen to match the required paint deposition accuracy, where a finer mesh size is more computationally intensive but, provides a higher degree of accuracy. Once the mesh is generated, a computing system implementing the methods described herein generates internal representations of the surface normal direction at each mesh point and this additional surface curvature data can be used by the paint deposition method during simulation.

In an embodiment, at the start of simulation, the deposition information at the mesh points is reset to zero. As the simulation progresses, a running total of the deposition at each mesh point is kept based on the ongoing aspects of the paint deposition model and method. This includes robot and conveyor motion speeds, paint brush to painted product relative displacements, paint spray distance, profile intensity distribution, and flow direction computations with respect to the paint mesh points and mesh surface normals.

Embodiments may also employ computational performance optimization so that the paint deposition calculations are applied only to the relevant surface mesh areas near the paint cone from among the larger collection of possible parts to be painted.

Another embodiment interactively displays the computed painting results as well as the painting statistics on a per brush basis. The statistics include information about the paint brush usage timings, the total paint sprayed, the amount of paint wasted (that is any paint that was sprayed but that did not actually get applied to the products that were specified to be painted) and the resulting efficiency of the process. In another embodiment, the results of the paint deposition are displayed graphically on the surfaces being painted and the visualization can show either the coloring effect of the applied paint on the underlying surface color or a threshold based contour mapping of the deposition thickness distribution over the painted surfaces.

During the course of a painting simulation, the process may be iterated to improve the resulting paint deposition by modifying paint profile settings as well as robot operations in the robot task. Changes to the parameters may be based upon the painting statistics and deposition results. Further, in an embodiment, once satisfactory results for the robot task, i.e., robot controls and operations, and the resulting painted products are achieved, the finished products can be saved along with the paint result information and the paint gun and process settings used to achieve the satisfactory results. Thus, the results and settings can be retrieved and reviewed at a later time and used to control a real-world painting process in accordance with the settings.

In addition to the gun calibration properties, other simulation factors that can affect the accuracy of the final paint thickness prediction include: the mesh resolution of the tessellation for the painted surface which, according to an embodiment, is an order of magnitude smaller than the paint brush cone diameter, the correctness of the painted part CAD models and the matching accuracy of paint trajectories laid out on the models, the style of the painting robot programs and the accurate setting of motion planning parameters to match the actual painting robot. In an embodiment, the foregoing factors may be modified as needed to achieve a desired level of accuracy.

Figure 16:
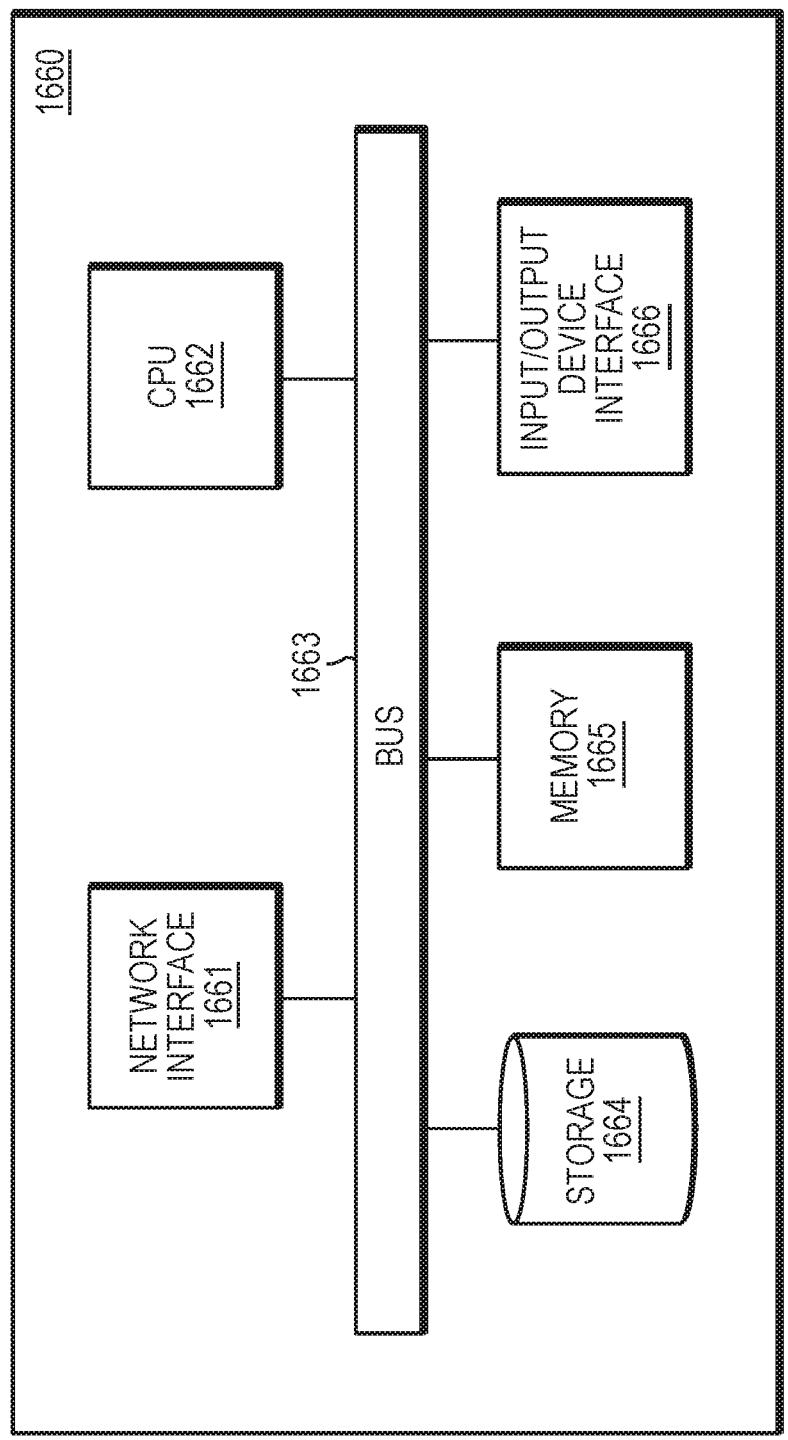
FIG. 16 is a simplified block diagram of a computer system for simulating electrostatic painting on a real-world object according to an embodiment.

FIG. 16 is a simplified block diagram of a computer-based system 1660 that may be used to simulate electrostatic painting on a real-world object according to any variety of the embodiments of the present invention described herein. The system 1660 comprises a bus 1663. The bus 1663 serves as an interconnect between the various components of the system 1660. Connected to the bus 1663 is an input/output device interface 1666 for connecting various input and output devices such as a keyboard, mouse, display, speakers, etc. to the system 1660. A central processing unit (CPU) 1662 is connected to the bus 1663 and provides for the execution of computer instructions implementing embodiments. Memory 1665 provides volatile storage for data used for carrying out computer instructions implementing embodiments described herein, such as those methods and user interface previously described in relation to FIGS. 8 and 13-14. Storage 1664 provides non-volatile storage for software instructions, such as an operating system (not shown) and embodiment configurations, etc. The system 1660 also comprises a network interface 1661 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 1660, or a computer network environment such as the computer environment 1770, described herein below in relation to FIG. 17. The computer system 1660 may be transformed into the machines that execute the methods described herein, for example, by loading software instructions into either memory 1665 or non-volatile storage 1664 for execution by the CPU 1662. One of ordinary skill in the art should further understand that the system 1660 and its various components may be configured to carry out any embodiments or combination of embodiments of the present invention described herein. Further, the system 1660 may implement the various embodiments described herein utilizing any combination of hardware, software, and firmware modules operatively coupled, internally, or externally, to the system 1660. Further, the system 1660 may be communicatively coupled to or be embedded within a device, e.g., a robot equipped with a spray paint gun, so as to control the device to paint a physical object as described herein.

Figure 17:
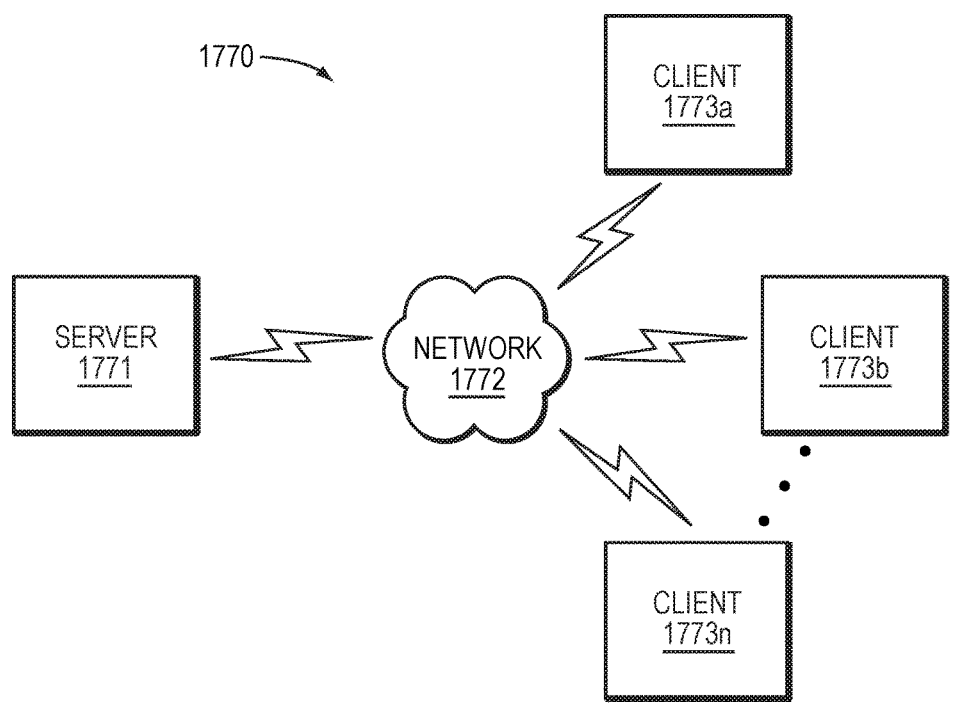
FIG. 17 is a simplified block diagram of a computer network environment in which an embodiment of the present invention may be implemented.

FIG. 17 illustrates a computer network environment 1770 in which an embodiment of the present invention may be implemented. In the computer network environment 1770, the server 1771 is linked through the communications network 1772 to the clients 1773a-n. The environment 1770 may be used to allow the clients 1773a-n, alone or in combination with the server 1771, to execute any of the methods described herein. For non-limiting example, computer network environment 1770 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method of simulating electrostatic painting on a real-world object, the method comprising:
   receiving an indication of paint deposition rate and an indication of maximum paint accumulation for a given real-world robotically controlled electrostatic paint gun, wherein the indication of maximum paint accumulation is indicative of maximum wrap-around paint accumulation for the given real-world robotically controlled electrostatic paint gun;
   representing paint deposition of the given real-world robotically controlled electrostatic paint gun in a virtual environment, said representing, for a subject time period, computing total paint accumulation on a given surface element of a model representing the real-world object, computing total paint accumulation including:
      if there is a wrap-around path within a spray zone of the paint gun for paint particles to reach the given surface element, determining wrap-around paint accumulation on the given surface element during the subject time period using the indication of paint deposition rate, where the wrap-around paint accumulation during the subject time period stops if the maximum paint accumulation is reached;
      determining direct paint accumulation on the given surface element for the subject time period; and
      determining total paint accumulation for the given surface element for the subject time period by summing the determined wrap-around paint accumulation and the determined direct paint accumulation; and
   generating a parameter file including parameters accounting for the determined total paint accumulation for the given surface element, the generated parameter file enabling precision operation of the given real-world robotically controlled electrostatic paint gun to paint the real-world object.

2. The method of claim 1 further comprising:
   receiving an indication of desired paint accumulation for the given surface element; and
   wherein, generating the parameter file further includes:
      determining paint process settings to control the given real-world electrostatic paint gun to attain the desired paint accumulation for the given surface element; and
      including in the parameter file the determined paint process settings.

3. The method of claim 2 wherein the paint process settings include at least one of: speed of the given real-world robotically controlled electrostatic paint gun, path of the given real-world robotically controlled electrostatic paint gun, and distance between the real-world object and the given real-world robotically controlled electrostatic paint gun.

4. The method of claim 2 further comprising:
   transmitting the generated parameter file including the determined paint process settings to the given real-world robotically controlled electrostatic paint gun, the transmitting causing the given real-world robotically controlled electrostatic paint gun to paint the real-world object in accordance with the determined paint process settings.

5. The method of claim 1 further comprising:
   receiving paint process parameters.

6. The method of claim 5 wherein the paint process parameters include at least one of: paint parameters, position parameters, and calibration parameters.

7. The method of claim 1 further comprising:
   computing total paint accumulation for the given surface element for a plurality of time periods composing total time for a painting process, wherein computing total paint accumulation for the plurality of time periods determines total paint accumulation for the given surface element for the painting process.

8. The method of claim 1 further comprising:
   computing total paint accumulation on a plurality of surface elements of the model representing the real-world object for a plurality of time periods composing total time for a painting process, wherein computing total paint accumulation on the plurality of surface elements for the plurality of time periods determines total paint accumulation for each of the plurality of surface elements for the painting process.

9. The method of claim 8 further comprising:
   receiving an indication of desired paint accumulation for each of the plurality of surface elements; and
   wherein, generating the parameter file further includes:
      determining paint process settings to control the given real-world electrostatic paint gun to attain the desired paint accumulation for each of the plurality of surface elements during the painting process; and
      including in the parameter file the determined paint process settings.

10. The method of claim 9 further comprising:
    iterating determining the paint process settings to determine optimized paint process settings that attain the desired paint accumulation for each of the plurality of surface elements during the painting process.

11. The method of claim 1 further comprising:
    based on the generated parameter file, displaying an indication of the determined total paint accumulation.

12. The method of claim 1 wherein the model is a finite element model and the given surface element is a given tessellated element of the finite element model.

13. A system to simulate electrostatic painting on a real-world object, the system comprising:
    a processor; and
    a memory with computer code instructions stored thereon, the processor and the memory, with the computer code instructions being configured to cause the system to:
       receive an indication of paint deposition rate and an indication of maximum paint accumulation for a given real-world robotically controlled electrostatic paint gun, wherein the indication of maximum paint accumulation is indicative of maximum wrap-around paint accumulation for the given real-world robotically controlled electrostatic paint gun;

represent paint deposition of the given real-world robotically controlled electrostatic paint gun in a virtual environment, said representing, for a subject time period, computing total paint accumulation on a given surface element of a model representing the real-world object, computing total paint accumulation including:
  if there is a wrap-around path within a spray zone of the paint gun for paint particles to reach the given surface element, determining wrap-around paint accumulation on the given surface element during the subject time period using the indication of paint deposition rate, where the wrap-around paint accumulation during the subject time period stops if the maximum paint accumulation is reached;
  determining direct paint accumulation on the given surface element for the subject time period; and
  determining total paint accumulation for the given surface element for the subject time period by summing the determined wrap-around paint accumulation and the determined direct paint accumulation; and
generate a parameter file including parameters accounting for the determined total paint accumulation for the given surface element, the generated parameter file enabling precision operation of the given real-world robotically controlled electrostatic paint gun to paint the real-world object.

14. The system of claim 13 wherein the processor and the memory, with the computer code instructions, are further configured to cause the system to:
receive an indication of desired paint accumulation for the given surface element; and
in generating the parameter file:
  determine paint process settings to control the given real-world electrostatic paint gun to attain the desired paint accumulation for the given surface element; and
  include in the parameter file the determined paint process settings.

15. The system of claim 14 wherein the processor and the memory, with the computer code instructions, are further configured to cause the system to:
transmit the generated parameter file including the determined paint process settings to the given real-world robotically controlled electrostatic paint gun, the transmitting causing the given real-world robotically controlled electrostatic paint gun to paint the real-world object in accordance with the determined paint process settings.

16. The system of claim 13 wherein the processor and the memory, with the computer code instructions, are further configured to cause the system to:
compute total paint accumulation for the given surface element for a plurality of time periods composing total time for a painting process, wherein computing total paint accumulation for the plurality of time periods determines total paint accumulation for the given surface element for the painting process.

17. The system of claim 13 wherein the processor and the memory, with the computer code instructions, are further configured to cause the system to:
compute total paint accumulation on a plurality of surface elements of the model representing the real-world object for a plurality of time periods composing total time for a painting process, wherein computing total paint accumulation on the plurality of surface elements for the plurality of time periods determines total paint accumulation for each of the plurality of surface elements for the painting process.

18. The system of claim 17 wherein the processor and the memory, with the computer code instructions, are further configured to cause the system to:
receive an indication of desired paint accumulation for each of the plurality of surface elements;
in generating the parameter file:
  determine paint process settings to control the given real-world electrostatic paint gun to attain the desired paint accumulation for each of the plurality of surface elements during the painting process; and
  include in the parameter file the determined paint process settings; and
iterate determining the paint process settings to determine optimized paint process settings that attain the desired paint accumulation for each of the plurality of surface elements during the painting process.

19. The system of claim 13 wherein the processor and the memory, with the computer code instructions, are further configured to cause the system to:
based on the generated parameter file, display an indication of the determined total paint accumulation.

20. A non-transitory computer program product to simulate electrostatic painting on a real-world object, the computer program product executed by a server in communication across a network with one or more clients and comprising:
a computer readable medium, the computer readable medium comprising program instructions which, when executed by a processor, causes the processor to:
  receive an indication of paint deposition rate and an indication of maximum paint accumulation for a given real-world robotically controlled electrostatic paint gun, wherein the indication of maximum paint accumulation is indicative of maximum wrap-around paint accumulation for the given real-world robotically controlled electrostatic paint gun;
  represent paint deposition of the given real-world robotically controlled electrostatic paint gun in a virtual environment, said representing, for a subject time period, computing total paint accumulation on a given surface element of a model representing the real-world object, computing total paint accumulation including:
    if there is a wrap-around path within a spray zone of the paint gun for paint particles to reach the given surface element, determining wrap-around paint accumulation on the given surface element during the subject time period using the indication of paint deposition rate, where the wrap-around paint accumulation during the subject time period stops if the maximum paint accumulation is reached;
    determining direct paint accumulation on the given surface element for the subject time period; and
    determining total paint accumulation for the given surface element for the subject time period by summing the determined wrap-around paint accumulation and the determined direct paint accumulation; and generate a parameter file including parameters accounting for the determined total paint accumulation for the given surface element, the generated parameter file enabling precision operation of the given real-world robotically controlled electrostatic paint gun to paint the real-world object.

* * * * *